Sept. 12, 1939.  A. H. MASCHMEYER  2,172,756
PATTERN SORTER
Filed March 6, 1936   30 Sheets-Sheet 1

FIG. I.

INVENTOR
A. H. MASCHMEYER
BY W. A. Sparks
HIS ATTORNEY

Sept. 12, 1939.   A. H. MASCHMEYER   2,172,756
PATTERN SORTER
Filed March 6, 1936   30 Sheets-Sheet 2

INVENTOR
A. H. MASCHMEYER
BY H. A. Spark
HIS ATTORNEY

Sept. 12, 1939.         A. H. MASCHMEYER         2,172,756
                         PATTERN SORTER
             Filed March 6, 1936          30 Sheets-Sheet 3

INVENTOR
A.H. MASCHMEYER
BY *H.A. Sparks*
HIS ATTORNEY

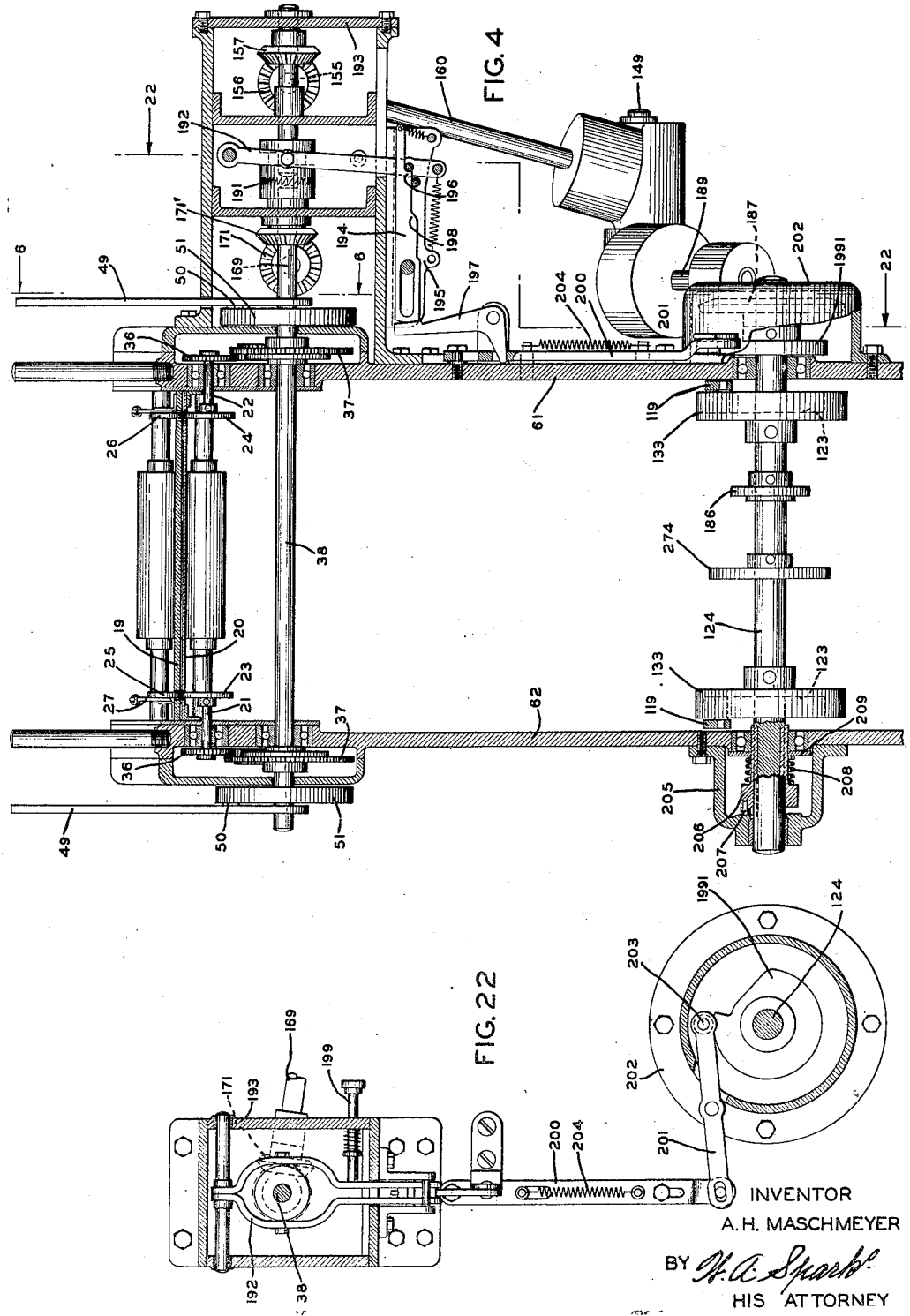

Sept. 12, 1939.  A. H. MASCHMEYER  2,172,756
PATTERN SORTER
Filed March 6, 1936   30 Sheets-Sheet 5
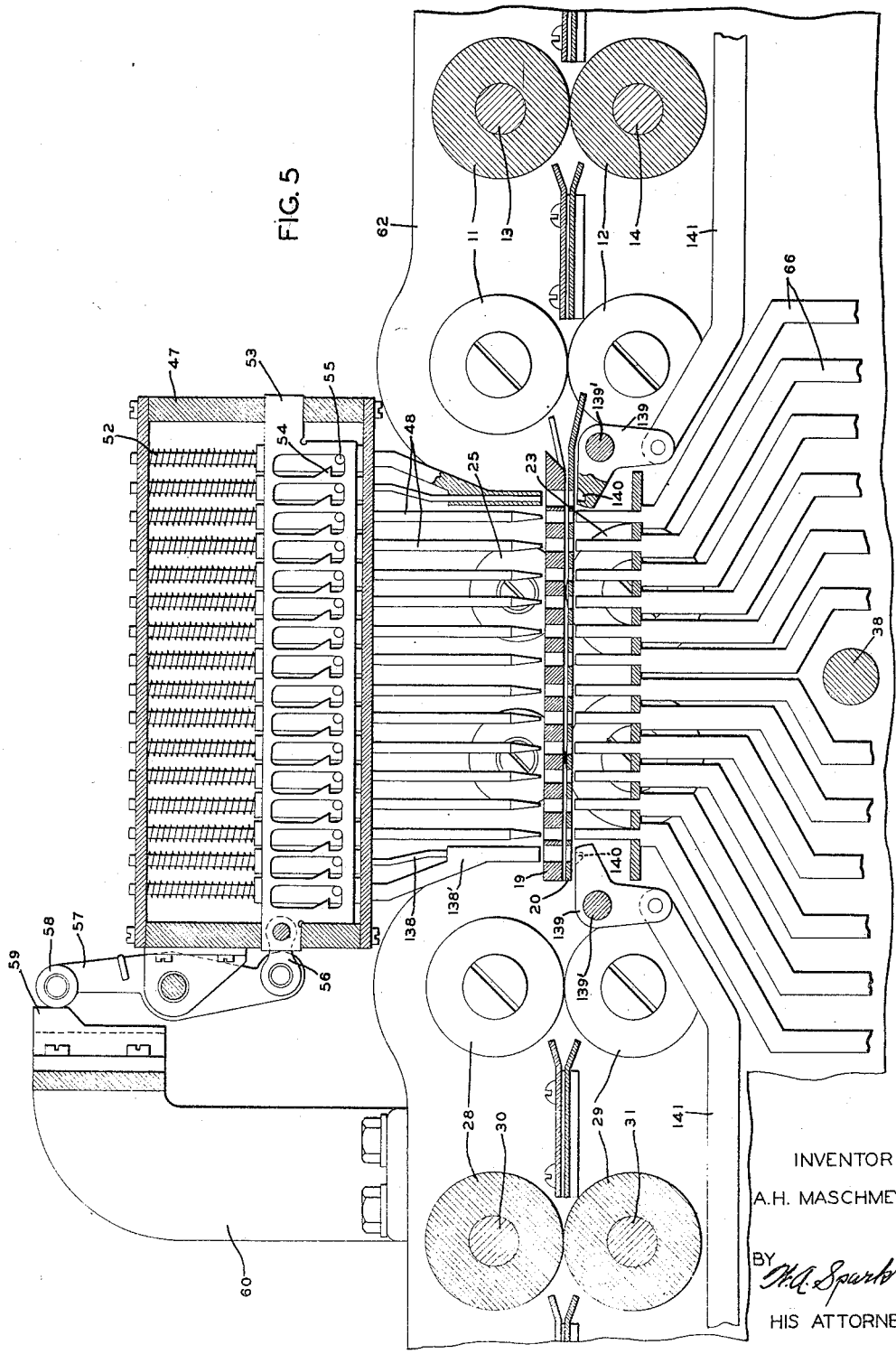
INVENTOR
A.H. MASCHMEYER
BY
HIS ATTORNEY Sept. 12, 1939.　　　A. H. MASCHMEYER　　　2,172,756
PATTERN SORTER
Filed March 6, 1936　　　30 Sheets-Sheet 6

INVENTOR
A. H. MASCHMEYER
BY *H. Q. Sparks*
HIS ATTORNEY

Sept. 12, 1939.   A. H. MASCHMEYER   2,172,756
PATTERN SORTER
Filed March 6, 1936    30 Sheets-Sheet 7

INVENTOR
A.H. MASCHMEYER
BY *H. A. Sparks*
HIS ATTORNEY

Sept. 12, 1939.  A. H. MASCHMEYER  2,172,756
PATTERN SORTER
Filed March 6, 1936  30 Sheets-Sheet 8

INVENTOR
A.H. MASCHMEYER
BY *signature*
HIS ATTORNEY

Sept. 12, 1939.  A. H. MASCHMEYER  2,172,756
PATTERN SORTER
Filed March 6, 1936  30 Sheets-Sheet 9
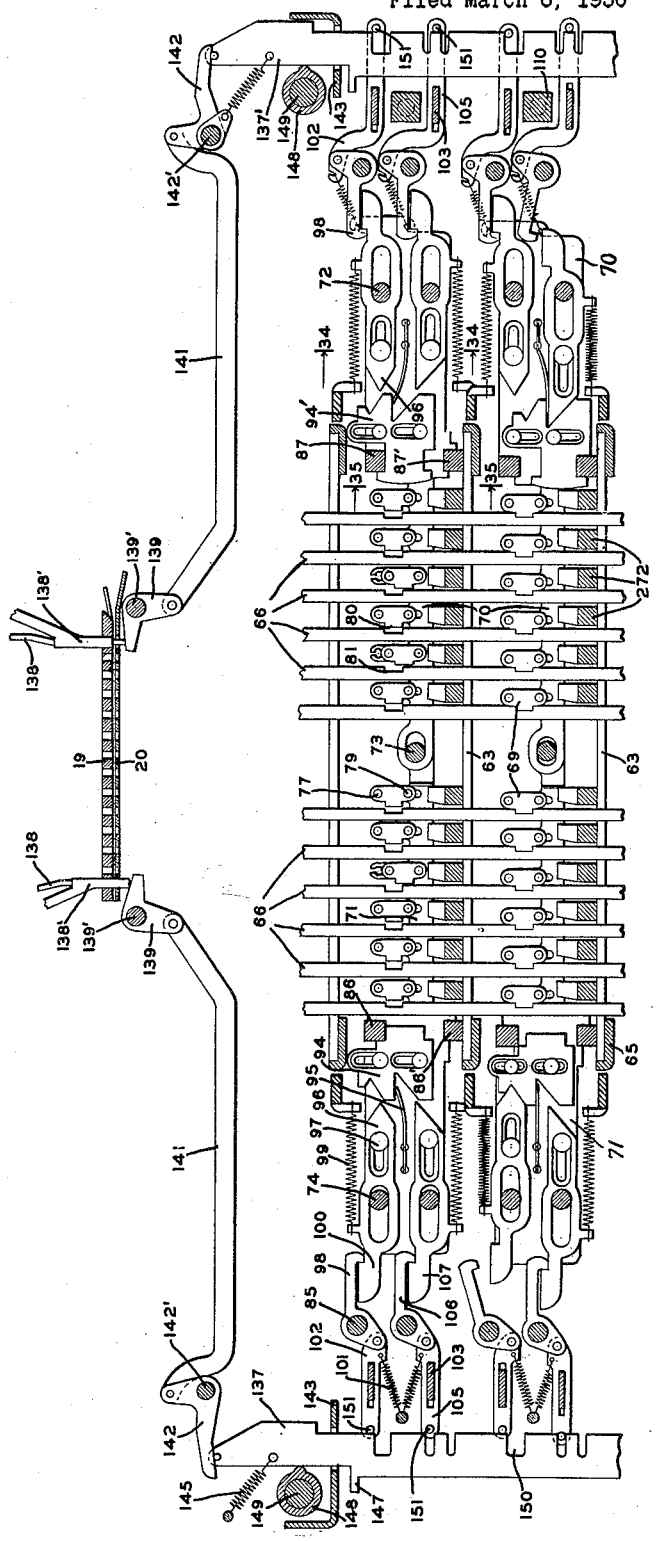
INVENTOR
A. H. MASCHMEYER
BY *W. A. Sparks*
HIS ATTORNEY Sept. 12, 1939.　　　A. H. MASCHMEYER　　　2,172,756
PATTERN SORTER
Filed March 6, 1936　　　30 Sheets-Sheet 10
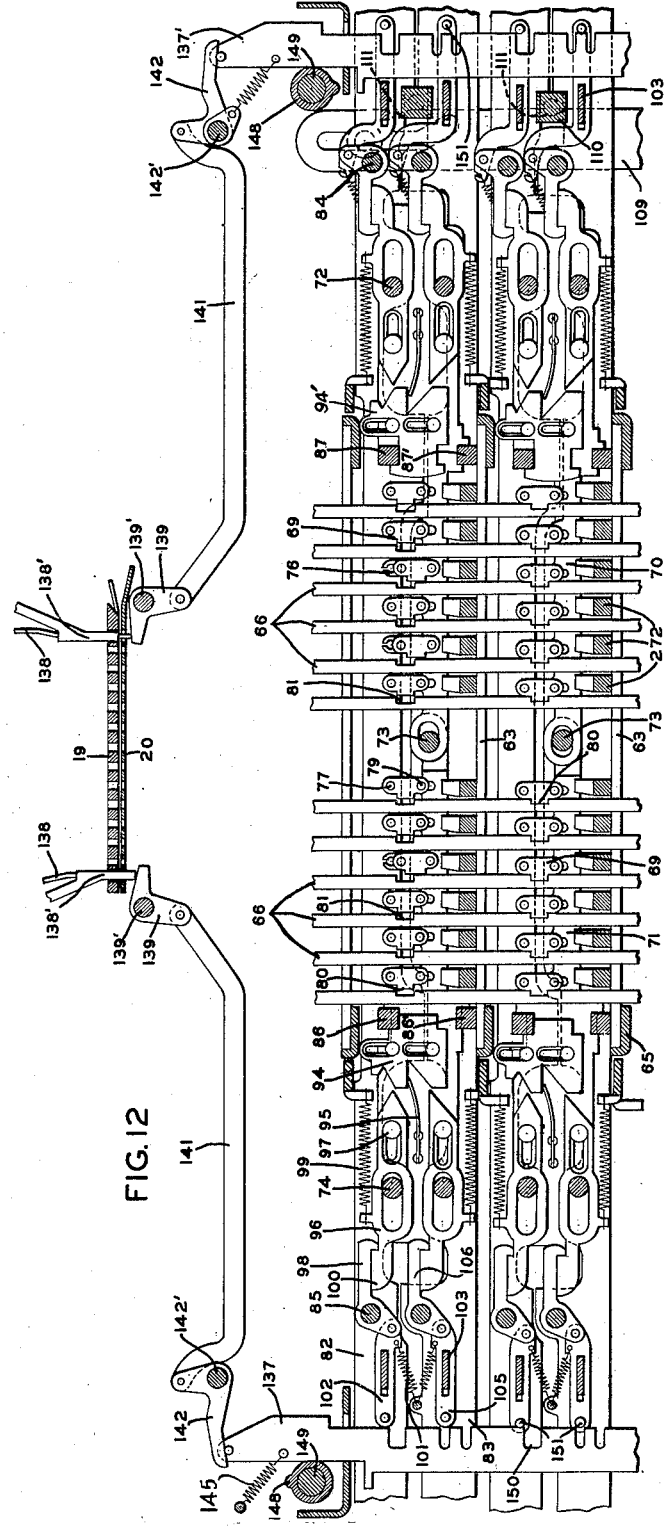
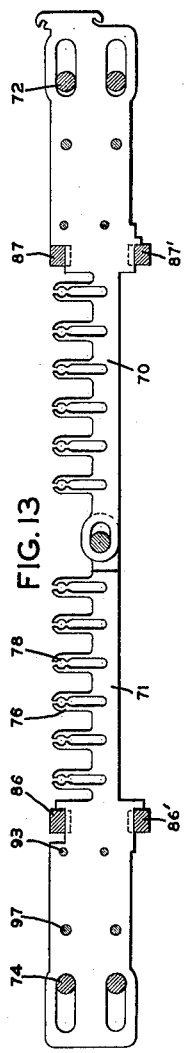
INVENTOR
A. H. MASCHMEYER
BY *W. A. Sparks*
HIS ATTORNEY Sept. 12, 1939. A. H. MASCHMEYER 2,172,756
PATTERN SORTER
Filed March 6, 1936 30 Sheets-Sheet 11

INVENTOR
A.H. MASCHMEYER
BY
HIS ATTORNEY

Sept. 12, 1939. A. H. MASCHMEYER 2,172,756
PATTERN SORTER
Filed March 6, 1936 30 Sheets-Sheet 12

INVENTOR
A. H. MASCHMEYER
BY H.A. Sperk
HIS ATTORNEY

Sept. 12, 1939.  A. H. MASCHMEYER  2,172,756
PATTERN SORTER
Filed March 6, 1936   30 Sheets-Sheet 14

INVENTOR
A. H. MASCHMEYER
BY *H. A. Sparks*
HIS ATTORNEY

Sept. 12, 1939.　　　A. H. MASCHMEYER　　　2,172,756
PATTERN SORTER
Filed March 6, 1936　　　30 Sheets-Sheet 15
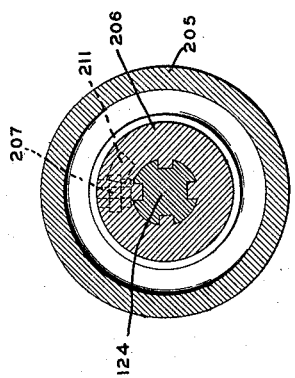
FIG. 19
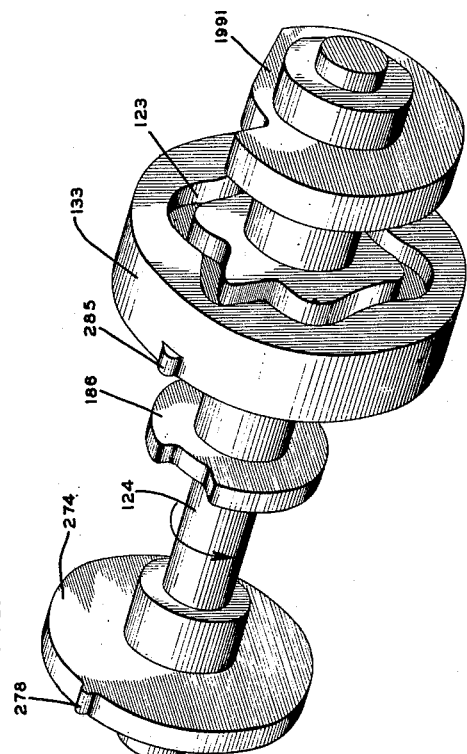
FIG. 18
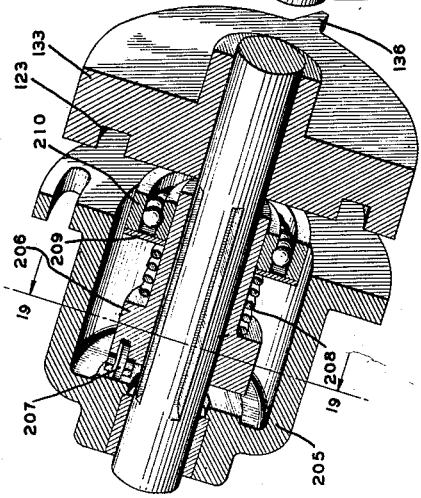
INVENTOR
A.H. MASCHMEYER
BY *H. C. Sparks*
HIS ATTORNEY.

Sept. 12, 1939.   A. H. MASCHMEYER   2,172,756
PATTERN SORTER
Filed March 6, 1936   30 Sheets-Sheet 16
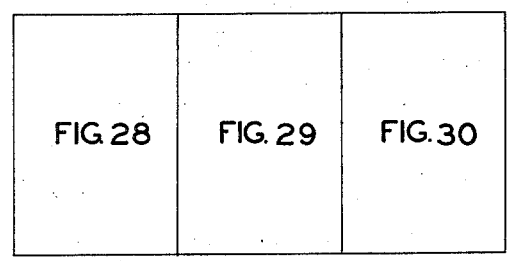
FIG. 27
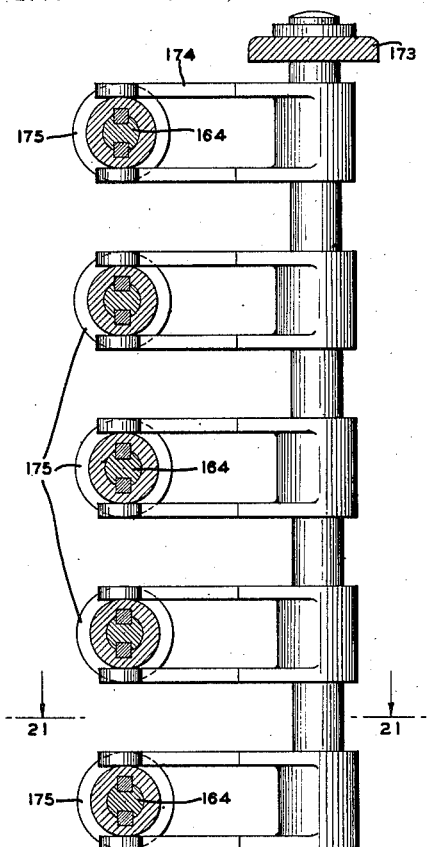
FIG. 20
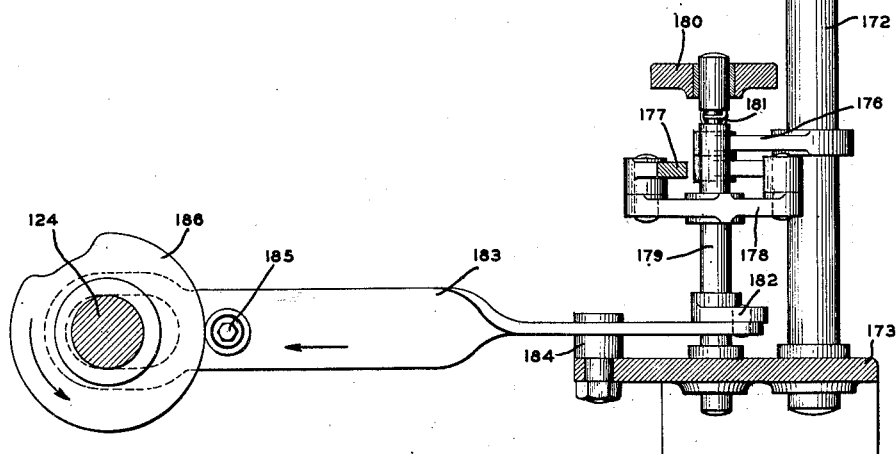
INVENTOR
A.H.MASCHMEYER
BY *H.A. Sparks*
HIS ATTORNEY

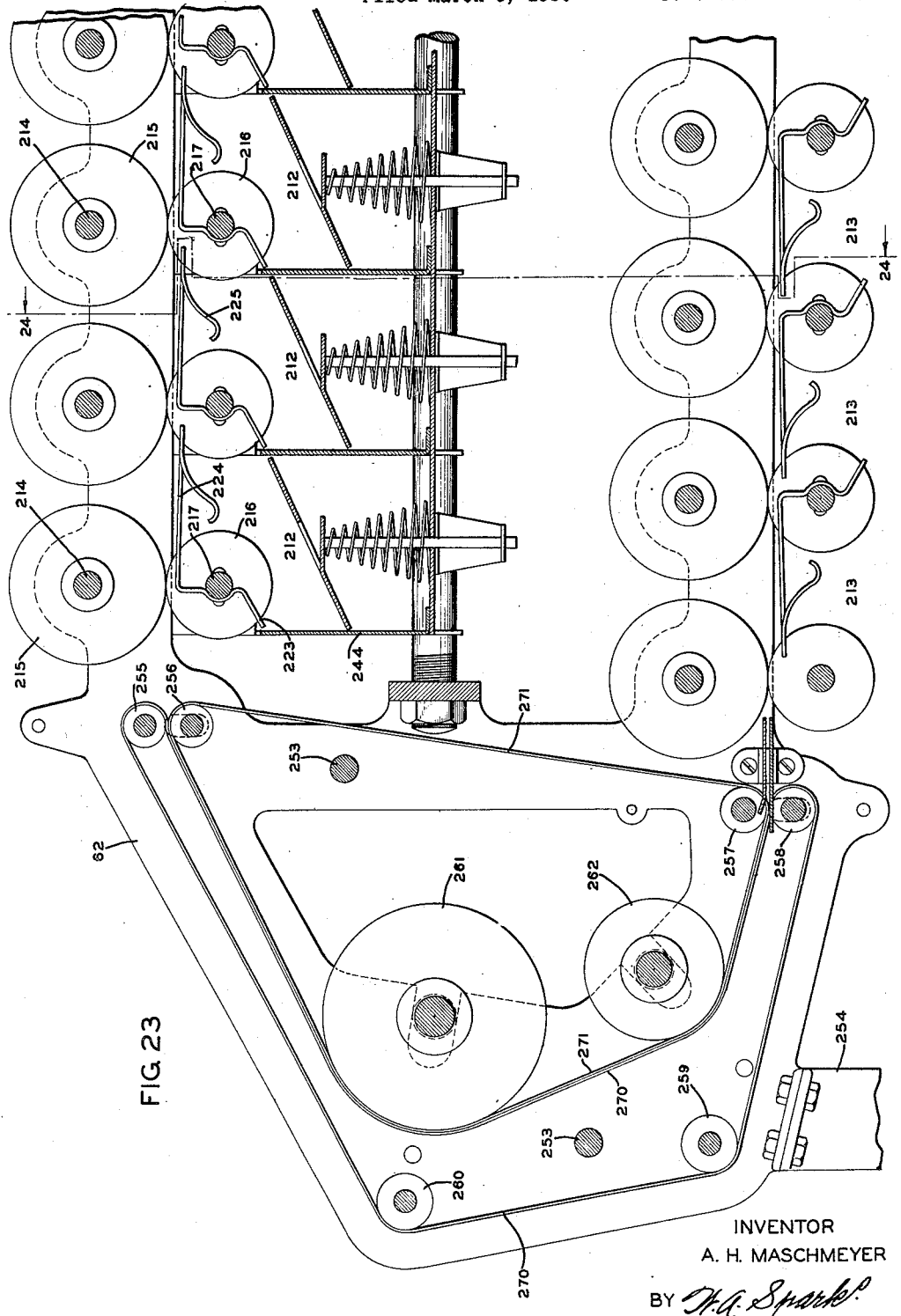

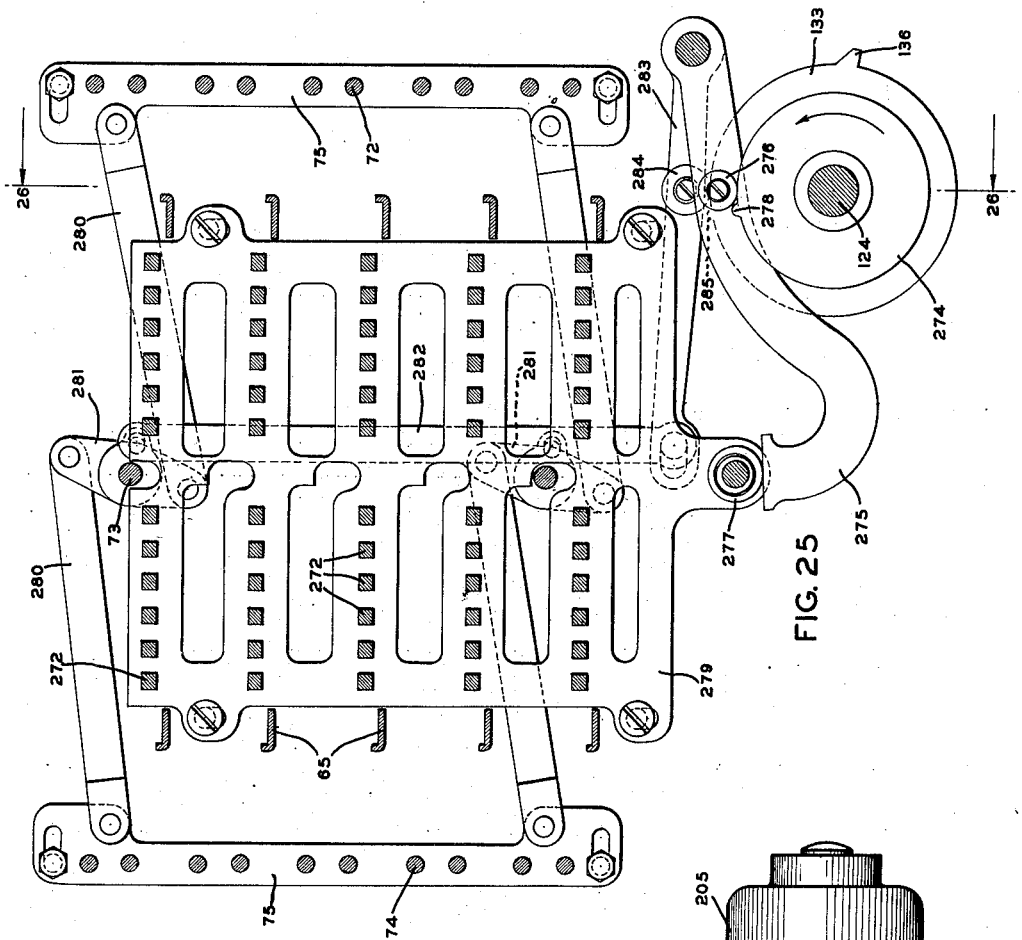
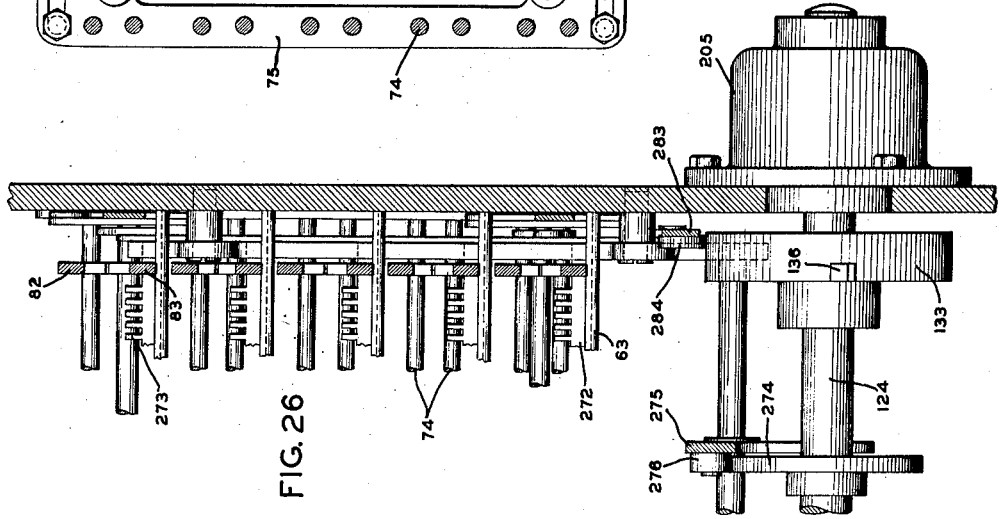

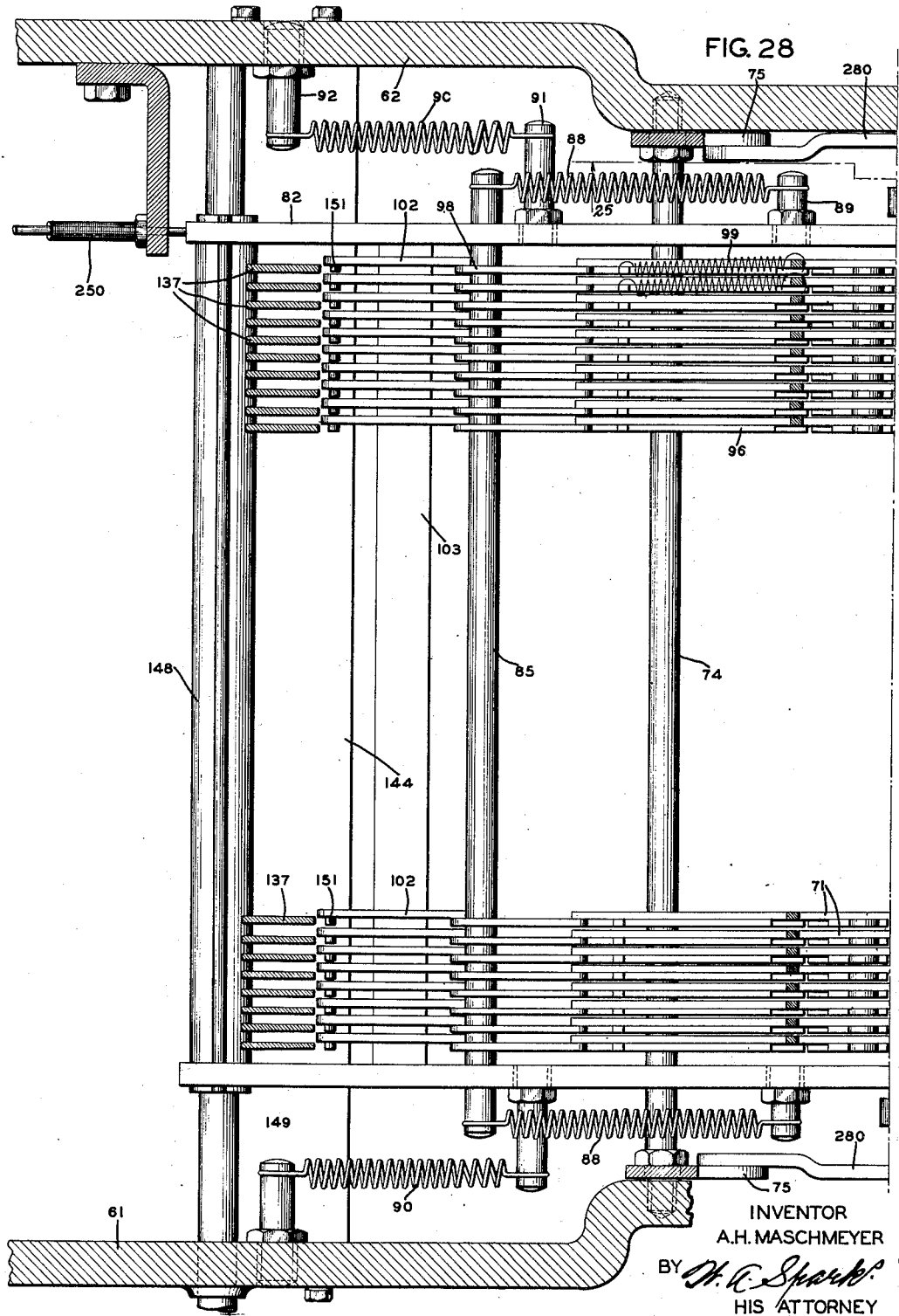

Sept. 12, 1939.   A. H. MASCHMEYER   2,172,756
PATTERN SORTER
Filed March 6, 1936   30 Sheets-Sheet 21

INVENTOR
A. H. MASCHMEYER
BY *H. C. Sparks*
HIS ATTORNEY

Sept. 12, 1939.  A. H. MASCHMEYER  2,172,756
PATTERN SORTER
Filed March 6, 1936  30 Sheets-Sheet 22

INVENTOR
A.H. MASCHMEYER
BY
HIS ATTORNEY

Sept. 12, 1939.　　　A. H. MASCHMEYER　　　2,172,756
PATTERN SORTER
Filed March 6, 1936　　　30 Sheets-Sheet 26

INVENTOR
A.H. MASCHMEYER
BY *W. A. Sparks*
HIS ATTORNEY

Sept. 12, 1939.   A. H. MASCHMEYER   2,172,756
PATTERN SORTER
Filed March 6, 1936   30 Sheets-Sheet 28

INVENTOR
A.H. MASCHMEYER
BY *F. C. Sparks*
HIS ATTORNEY

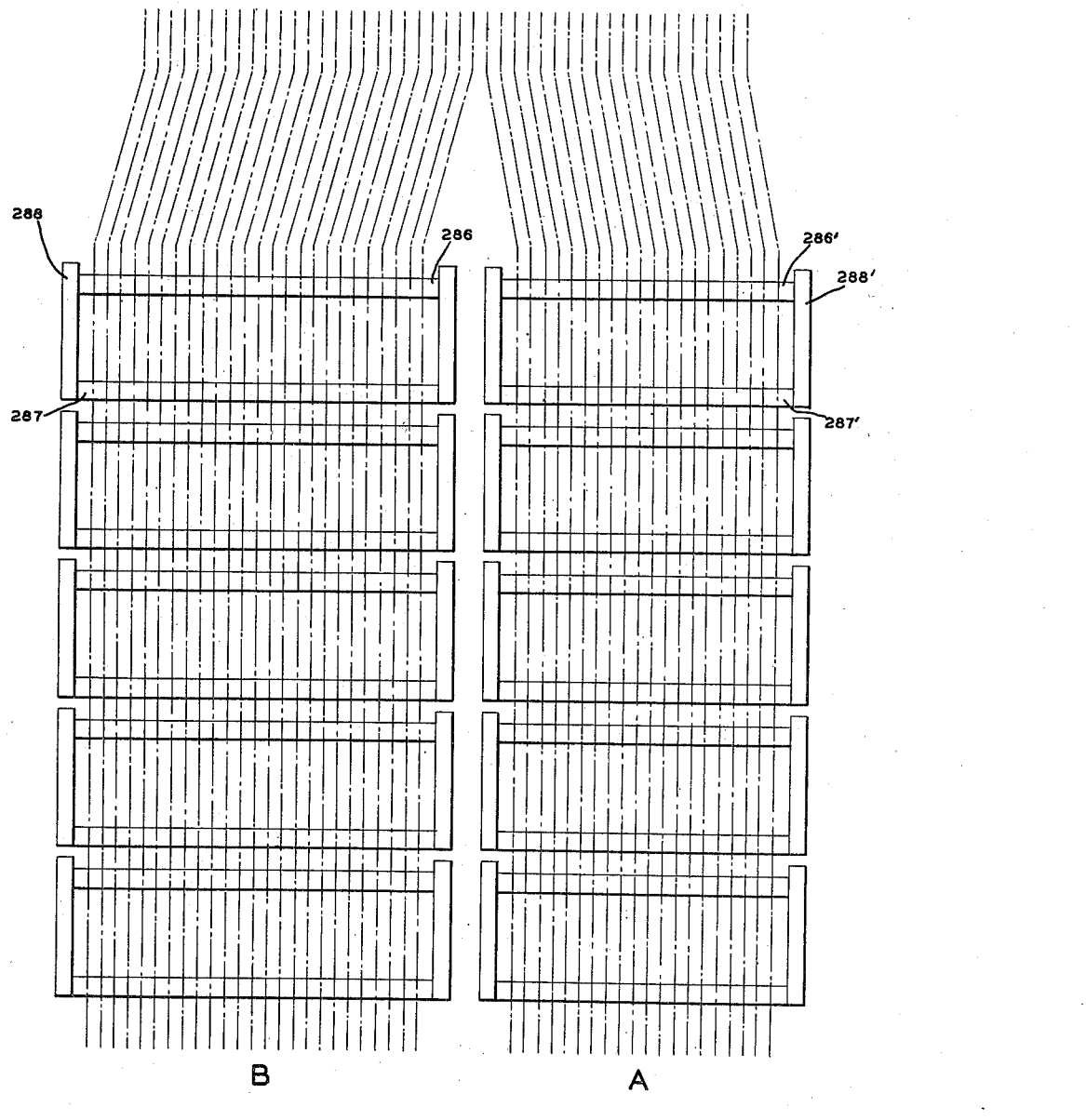

Patented Sept. 12, 1939

2,172,756

UNITED STATES PATENT OFFICE 2,172,756

PATTERN SORTER

August H. Maschmeyer, Brooklyn, N. Y., assignor to Remington Rand Inc., Buffalo, N. Y., a corporation of Delaware Application March 6, 1936, Serial No. 67,465

26 Claims. (Cl. 209—110)

This invention relates to sorting or classifying machines, and particularly to machines for sorting punched cards in accordance with a plurality of patterns in a single sorting operation, that is, during a single run of the cards through the machine.

The present invention is an improvement on applicant's United States Patent No. 2,078,090, for a Pattern sorting device, granted on April 20, 1937.

This patent discloses a semi-automatic machine for sorting punched cards in accordance with a plurality of card patterns during a single run of the cards through the machine.

The earlier machine is set manually in accordance with the several card patterns to be selected, and as the punched cards are fed through the machine, the cards having patterns identical with those set in the machine are sorted in accordance with such patterns, while the remaining cards are deposited in a reject pocket.

The sorter disclosed in the present application differs from the earlier sorter in that the patterns to be selected are not set up manually in the machine but are set up automatically under control of master cards. Another difference between the present sorter and the earlier one is that in the earlier sorter the unselected cards are deposited in a single reject pocket, whereas in the present sorter they are sorted in accordance with their file classifications.

A brief description of the invention will be given here to facilitate an understanding of the detailed description to follow.

The present machine is designed to search one or more classes of a punched card file, select one or more cards from the file classes searched, and sort the remaining cards according to their file classification. The punched cards kept on file may be called detail cards. These cards are filed by classes, and the class to which each card belongs is punched in the card. In addition to the filing classification, certain data is punched in each detail card. Thus, in an insurance company accounting system, the data recorded on a detail card may include the name and address of the insured, the type of policy, the amount of the policy, the date on which each premium is payable, and the amount of each premium, while the filing classification recorded on the card may be the number of the policy. In a finger-print identification card filing system, the data recorded on a detail card may be the characteristics of a set of finger-prints while the recorded filing classification may be the Henry system classification of the set of prints. The system of classifying finger-prints will be explained later.

For convenience of description, the record of the data on each detail card may be called the selecting pattern and the record of the filing classification may be called the redistributing pattern. The reason for adopting this terminology will appear later.

Suppose it is desired to select five different detail cards which are filed under five different file classifications. For each detail card to be selected, a master card is prepared which is perforated with the selecting pattern and the redistributing pattern of the detail card. The five master cards and the five file classifications of detail cards containing the detail cards to be selected are placed in the machine, and the cards are then successively fed to an analyzing device, the master cards being first to reach that device. The present machine is provided with five pattern storage sections which are successively brought under control of the analyzing device. As each of the five master cards is presented to the analyzing device, the patterns in the card are stored in one of the pattern storage sections; the patterns in successive master cards being stored in consecutive pattern storage sections. Thus, the first master card has its selecting and redistributing patterns stored in the first pattern storage section, the second master card has its selecting and redistributing patterns stored in the second pattern storage section, etc.

After the patterns of the master cards have been stored in each of the five pattern storage sections, the machine automatically changes over from a pattern storing operation to a pattern comparing operation. As each detail card is presented to the analyzing device, its patterns are simultaneously compared with the patterns stored in each of the pattern storage sections. The machine is provided with two groups of stations or pockets, one being a group of selecting stations or pockets and the other being a group of redistributing stations or pockets. There is a selecting pocket and a redistributing pocket associated with each pattern storage section. When a detail card has a selecting and a redistributing pattern identical with the stored patterns in any section, both the selecting station and the redistributing station associated with that section are conditioned to receive the detail card, but the selecting station is given precedence over the redistributing station. When a detail card has only one pattern identical with a pattern stored in any storage section, and that pattern is a redistributing pattern, the redistributing station associated with that section is alone conditioned to receive the card. From this it is evident that the detail cards having selecting patterns identical with the stored selecting patterns are deposited in individual selecting pockets, and that the remaining detail cards of the several file classifications are deposited in individual redistributing pockets. Thus, not only are the selected detail cards sorted, but the unselected detail cards are also sorted in accordance with their file classification. It is thus evident that the machine enables detail cards having any one of five different selecting patterns to be selected from five different file classifications during a single run of the cards through the machine and that it enables the unselected detail cards to be redistributed in accordance with their file classifications.

In some filing systems, the detail cards are filed in accordance with a file classification appearing in one field of the cards and in other filing systems, the detail cards are filed in accordance with a file classification appearing in another field of the cards. Thus, in an insurance filing system, the cards may be filed in accordance with the policy number which appears in columns 1 to 8 of the card, and in a chain store accounting system, the cards may be filed in accordance with the store number, which appears in columns 40–45 of the cards. In order to provide a standard sorting machine capable of being used with any filing system, regardless of the field in which the file classification of the cards is punched, one form of the machine is provided with means for redistributing detail cards in accordance with a redistributing pattern appearing in a selected area of the cards. In this form of the machine each pattern storage section is divided into a number of area elements corresponding to a half-column on a card. Each area element in a pattern storage section is ordinarily associated with the selecting pocket individual to the section. But by means of special control holes in the master cards, any desired area elements in a section may be associated with the redistributing pocket individual to the section. Accordingly, when a detail card has a pattern identical with the pattern appearing in certain area elements of the section associated with a selecting pocket, the card is deposited in the selecting pocket, and, when it has a pattern identical with the pattern appearing in certain area elements of the section associated with a redistributing pocket, and identical with that pattern alone, the card is deposited in a redistributing pocket.

In some filing systems, the redistributing pattern may be invariably punched in a particular field or area of the detail cards. Thus, in a finger-print identification card filing system, the file classification or redistributing pattern is invariably punched in the same fields, the characteristics of the set of finger-prints being punched in other fields of the card. Accordingly, a machine used for searching a finger-print classification card file may have part of the area elements in each storage section associated with a selecting pocket and the remainder of the area elements in the section associated with a redistributing pocket. The selecting pattern is set up in the proper area elements in a section, and the redistributing pattern is also set up in the proper area elements in the section. It is evident that in this form of the machine, it is unnecessary to punch special control holes in the master cards to select the area elements of any section which are associated with the redistributing pocket individual to the station.

The machine is provided with disabling means whereby the data appearing in any area of the detail cards may be disregarded when comparing the pattern in the detail card with the patterns stored in the pattern storage sections. The reason for providing this disabling means may be briefly pointed out. In insurance work, for example, it may be desired at one time to select all cards representing policies on which a certain premium is paid, at another, to select all cards representing policies of a particular type. In the first instance, all the area elements in a storage section are disabled except those corresponding to the columns in the premium field and to the columns in the file classification field of the detail cards, and in the second instance, all the area elements in a storage section are disabled except those corresponding to the columns in the type of policy field and to the columns in the file classification field of the detail cards. In finger-print identification work, a person to be identified may have a finger missing. In such a case, it is necessary to disable the storage section area elements corresponding to the field on the detail cards in which the characteristics of the missing finger are recorded. The effect of such a disabling operation is that the machine selects any detail card having the same pattern on the remaining fingers. As will appear later, a similar disabling operation may be carried out when a finger-print is blurred or a finger tip is scarred, and it is impossible to determine certain characteristics of the finger-print. In this case, one or more columns in a field, rather than the entire field, are disabled.

In addition to disabling certain area elements of a pattern storage section, it may be necessary to prevent the setting of the area elements in one or more sections. This must be done whenever patterns are stored in less than the entire number of pattern storage sections. Thus, where a search is made through a single file classification for a single detail card, the selecting pattern of this card and the file classification of the group of cards in which the card is filed are stored in the first pattern storage section. In this case, four blank cards must follow the master card to prevent the four first detail cards from setting up their selecting and redistributing patterns in the other four storage sections. If this is not done, the patterns on the first four detail cards sensed by the analyzing device will be deposited in different selecting pockets, instead of being compared with the selecting and redistributing patterns stored in the first storage section, and then deposited in the selecting pocket or the redistributing pocket associated with that section. Likewise, where a search is made through several file classifications, say three, for a single detail card, it may be necessary to disable part of the area elements in some pattern storage sections, and to prevent the setting of the area elements in the remaining storage sections. In searching for a single detail card under the circumstances mentioned, the pattern on the card it is desired to select or the selecting pattern may be recorded on one master card, and the file classifications of the three classes to be searched may be recorded on three other master cards. As the patterns of the four master cards are set up in four pattern storage sections of the machine, it is necessary to insert a blank card between the master cards and the detail cards to prevent the setting of the area elements in the fifth pattern storage section. It is further necessary to disable the file classification field of the first pattern storage section and to disable all but the file classification field in each of the three succeeding storage sections.

It is evident from the foregoing outline of the function of the machine that it provides means for searching for one or more desired detail cards through one or more file classes of such cards. The selected cards are deposited in individual selecting pockets and the unselected cards are sorted in accordance with their file classification. The machine is further capable of being set to disregard the pattern in any area or areas of the detail cards and to select or redistribute these cards in accordance with the pattern in the remaining area or areas. The machine may also be set to select detail cards having a selecting pattern in any area and to redistribute such cards having a redistributing pattern in any other area. The modified form of the machine, as stated above, is capable of selecting detail cards when they have a selecting pattern in a definite area and of redistributing such cards when they have a redistributing pattern in another definite area. The machine is further capable of a discriminating operation when a detail card has patterns corresponding to both a stored selecting and a redistributing pattern. In this case, the card is deposited in a selecting pocket rather than in a redistributing pocket.

It is an object of this invention to store automatically a plurality of patterns corresponding to the patterns of punched master cards presented to an analyzing device.

It is a further object to store said patterns sequentially as the master cards are successively presented to the analyzing device.

It is another object to simultaneously compare the stored patterns with the patterns of cards presented to the analyzing device.

It is a further object to render the comparison ineffective during the storing operation, and the storage means unsettable during the comparison operation.

It is an additional object to change over automatically from the pattern storing operation to the pattern comparing operation.

It is another object to enable a station to be automatically prepared by a master card to receive other punched cards whenever such cards have a pattern corresponding to the pattern of the master card.

It is an additional object to prepare as many stations to receive a card as there are patterns in the card corresponding to stored patterns.

It is an additional object to give one station precedence in receiving a card whenever a plurality of stations are thus prepared.

It is another object to give a station in one group precedence in receiving a card whenever a station in each of a plurality of groups is prepared to receive the card.

It is an additional object to enable the patterns appearing in a selected area, or in selected areas, of a card to prepare a station in a predetermined group to receive the card.

It is another object to enable patterns appearing in invariable areas of a card to prepare a station in a predetermined group to receive the card.

It is a further object to give the pattern appearing in a predetermined area of a card precedence over the patterns appearing in other areas of the card in determining the sorting of the card.

It is an additional object to allow the pattern appearing in one predetermined area of a card to control the sorting of the card only when no pattern appears in another predetermined area of the card.

It is a further object to restore the machine automatically to its normal condition preparatory to the beginning of a new sorting operation.

It is another object to permit a single detail card to be selected from a group of cards in one file classification or from several groups of cards taken from different file classifications.

It is a further object to permit several detail cards to be selected from a group of cards in one file classification or from several groups of cards taken from different file classifications.

It is an additional object to permit the unselected detail cards to be sorted in accordance with their redistributing patterns or file classifications.

It is another object to permit a detail card to be selected when any portion of its selecting pattern is known and the remainder is undeterminable.

Other objects and features of the invention will be evident when the detailed description to follow and the appended claims are read in connection with the accompanying drawings, in which:

Fig. 1, which shows the relation of the principal mechanisms of the machine, is a side elevation of one embodiment of the invention, partly in section and with certain parts broken away to facilitate clearness of illustration.

Fig. 4 is a vertical section taken along the line 4—4 of Fig. 1, showing the details of the gear train, illustrated in Fig. 3 and of the clutch mechanism.

Fig. 5 is a section taken along the line 5—5 of Fig. 33, showing details of the analyzing device or sensing mechanism.

Fig. 9 illustrates a typical 5-unit code used in punching the master cards and the cards which are sorted by the machine.

Fig. 10 is a sectional view which illustrates two of the five sections shown in Fig. 2.

Fig. 11 is an isometric view showing certain details of construction.

Fig. 12 is a sectional view similar to that of Fig. 10.

Fig. 13 is a view, partly in section, showing details of construction.

Fig. 18 is an isometric view showing the main cams and the main cam shaft.

Fig. 19 is a sectional view, taken along the line 19—19 of Fig. 18, showing the means for locking the main cam shaft.

Fig. 20 is a sectional view, showing in detail certain of the parts of Fig. 2 with much of the mechanism removed for clearness, and showing particularly the control mechanism for the section releasing cams.

Fig. 22 is a sectional view, taken along the line 22—22 of Fig. 4, showing details of the mechanism for controlling the clutch between the main drive shaft and the main cam shaft.

Fig. 23 is a sectional view, taken along the center line of the receiving stations, which shows these stations.

Fig. 25 is a sectional view, taken along line 25—25 of Figs. 28, 29 and 30, and showing the releasing frame.

Fig. 26 is a sectional view, taken along line 26—26 of Fig. 25, showing the releasing frame and the selecting member releasing bars.

Fig. 27 is a schematic view showing the manner in which Figs. 28 to 30, inclusive, are arranged.

Figure 2:
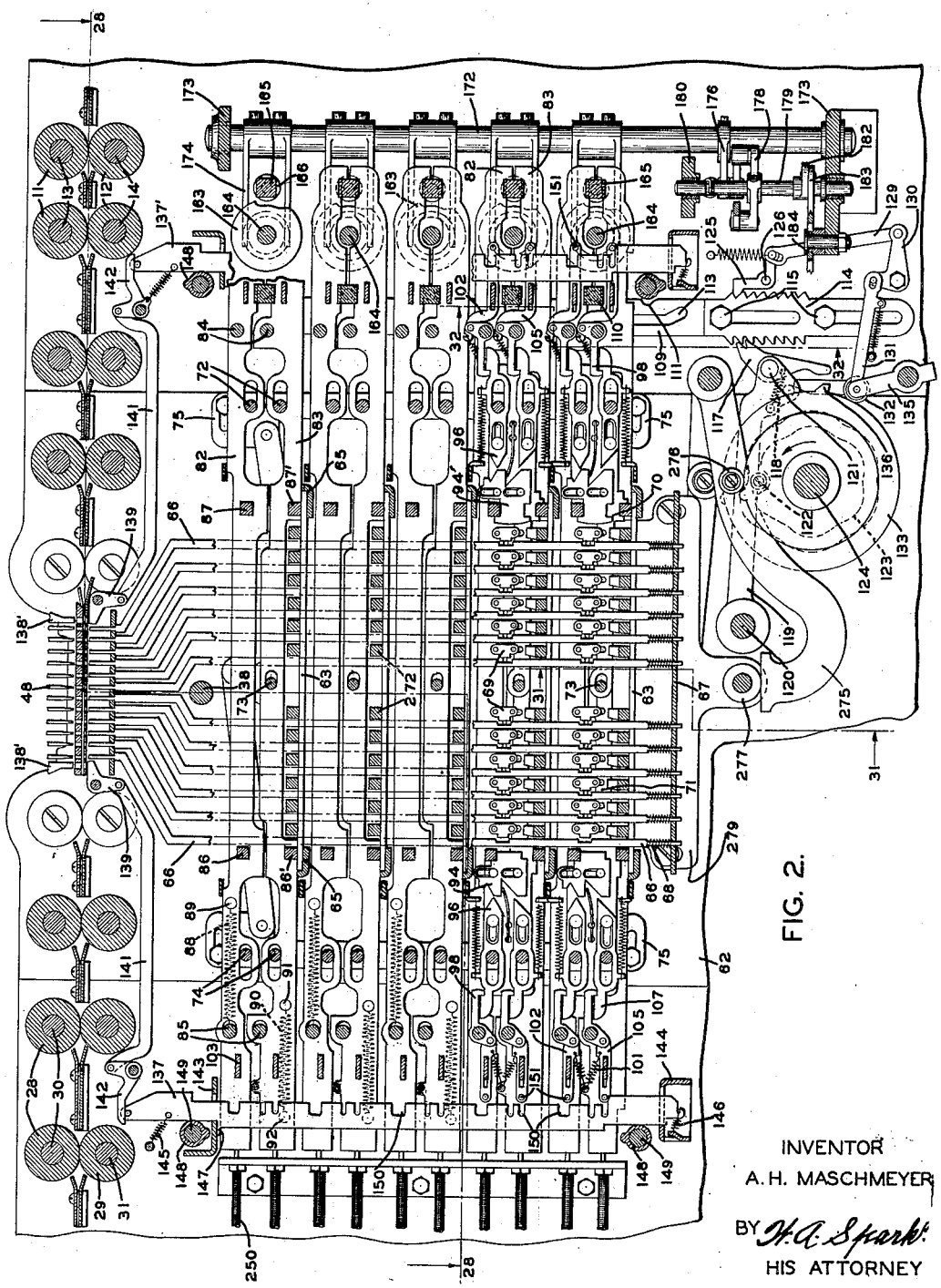
Fig. 2 is a view obtained by removing the side wall of Fig. 1, and shows details of the sorting control mechanism.
Figure 29:
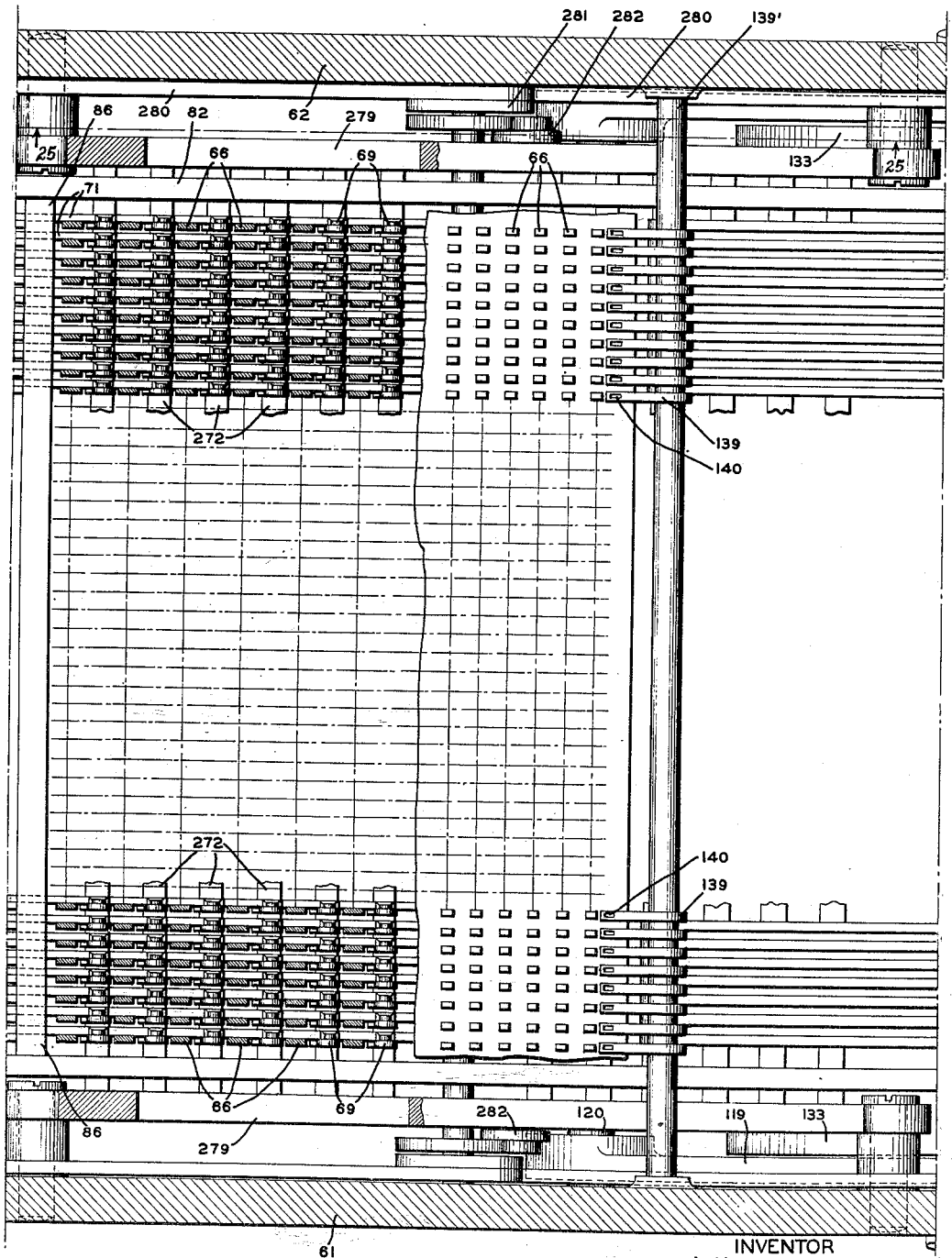
Figure 30:
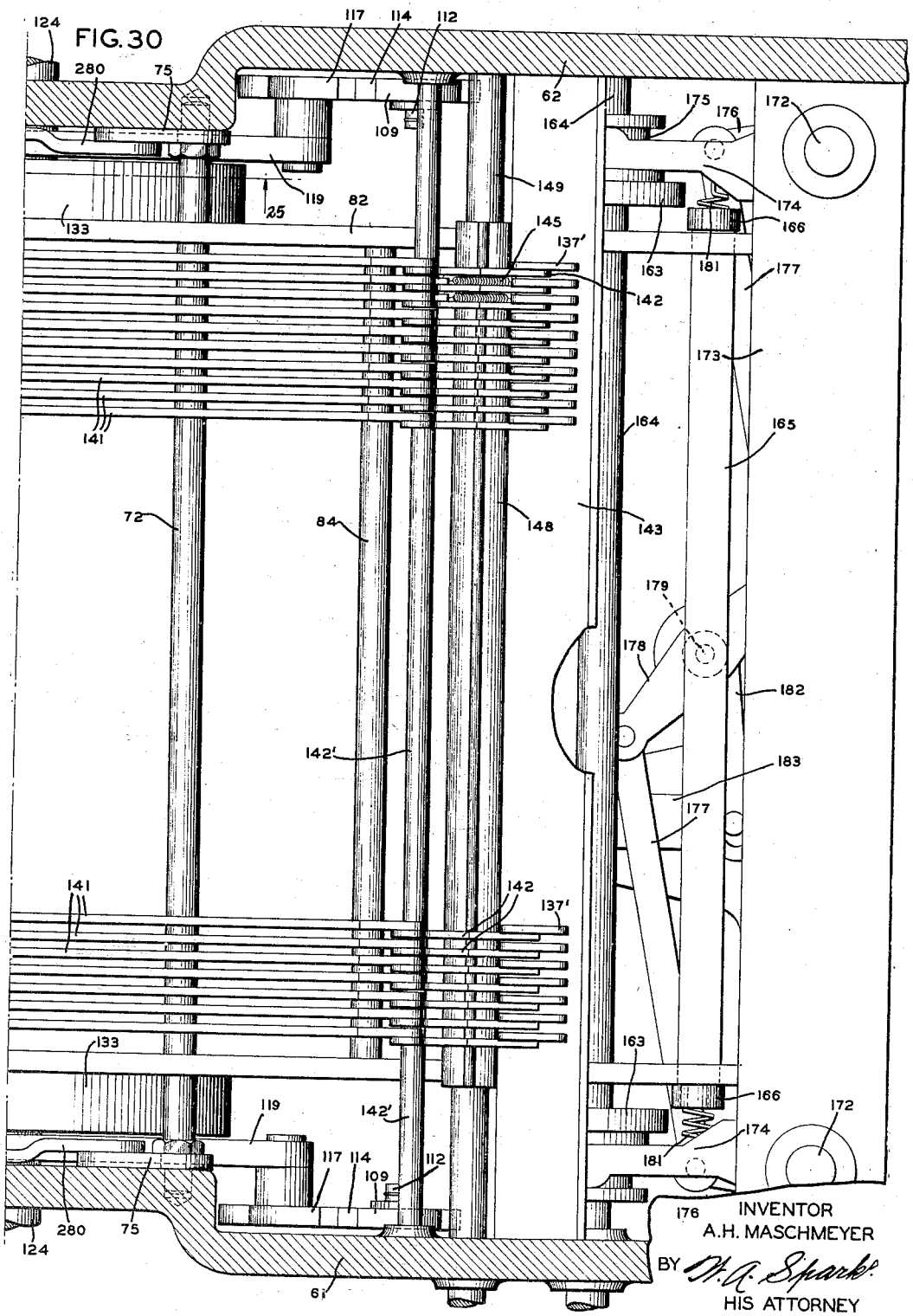

Figs. 28, 29 and 30, when arranged as illustrated in Fig. 27, form a sectional plan view, taken along line 28—28 of Fig. 2, which shows details of construction.

Figure 31:
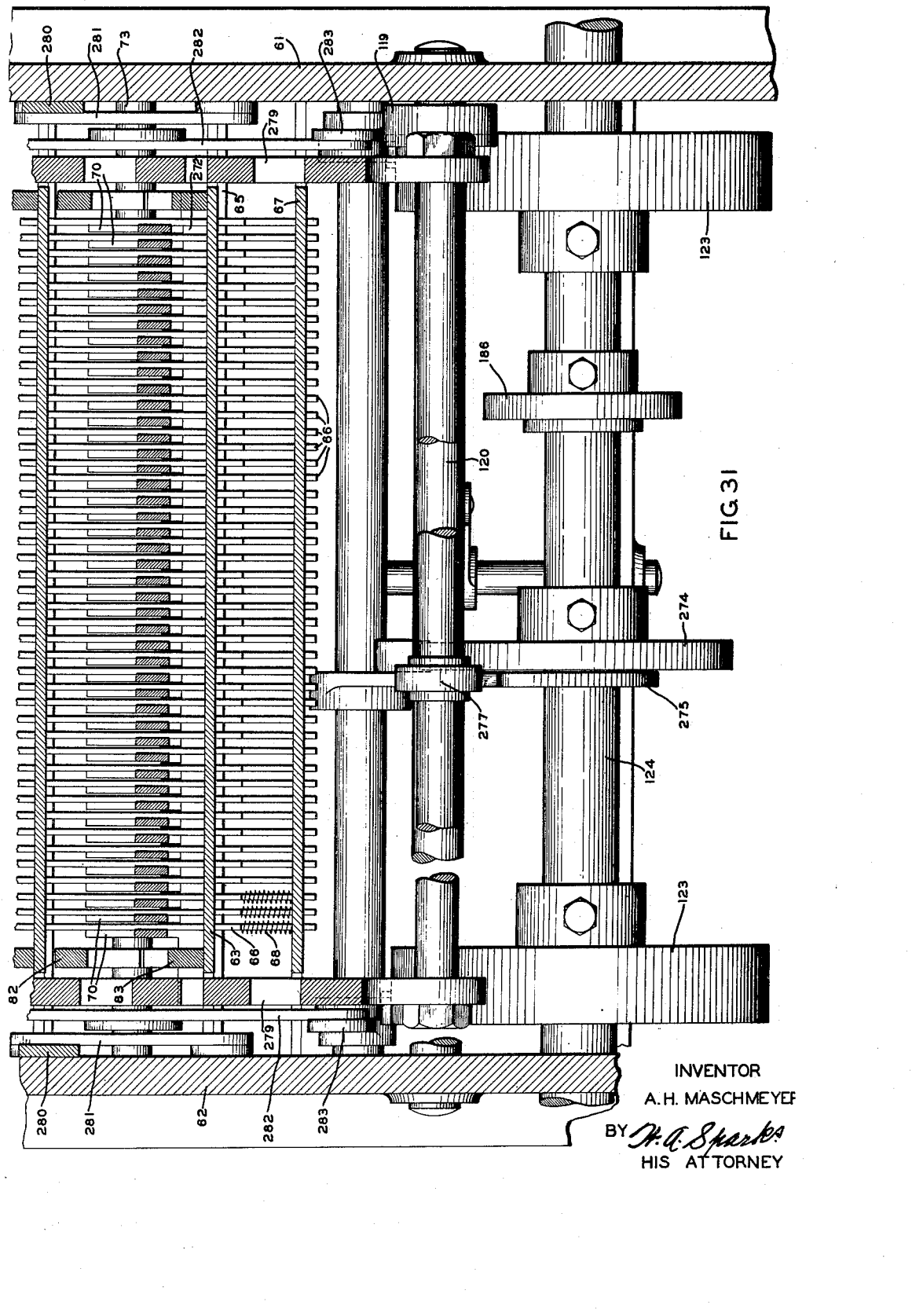

Fig. 31 is a sectional view, taken along the line 31—31 of Fig. 2, showing details of construction.

Figure 32:
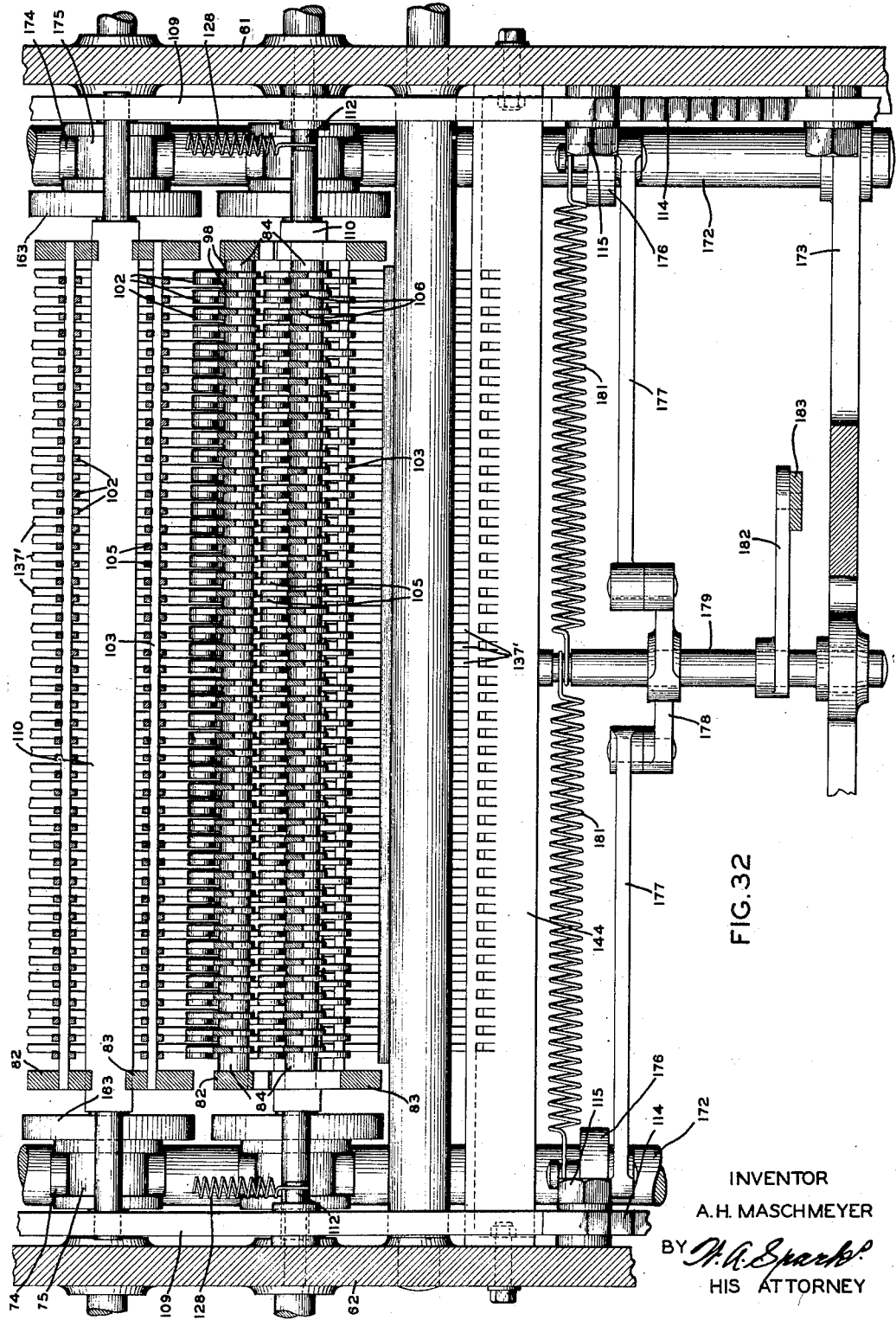

Fig. 32 is a sectional view, taken along the line 32—32 of Fig. 2, showing additional details of construction.

Figure 33:
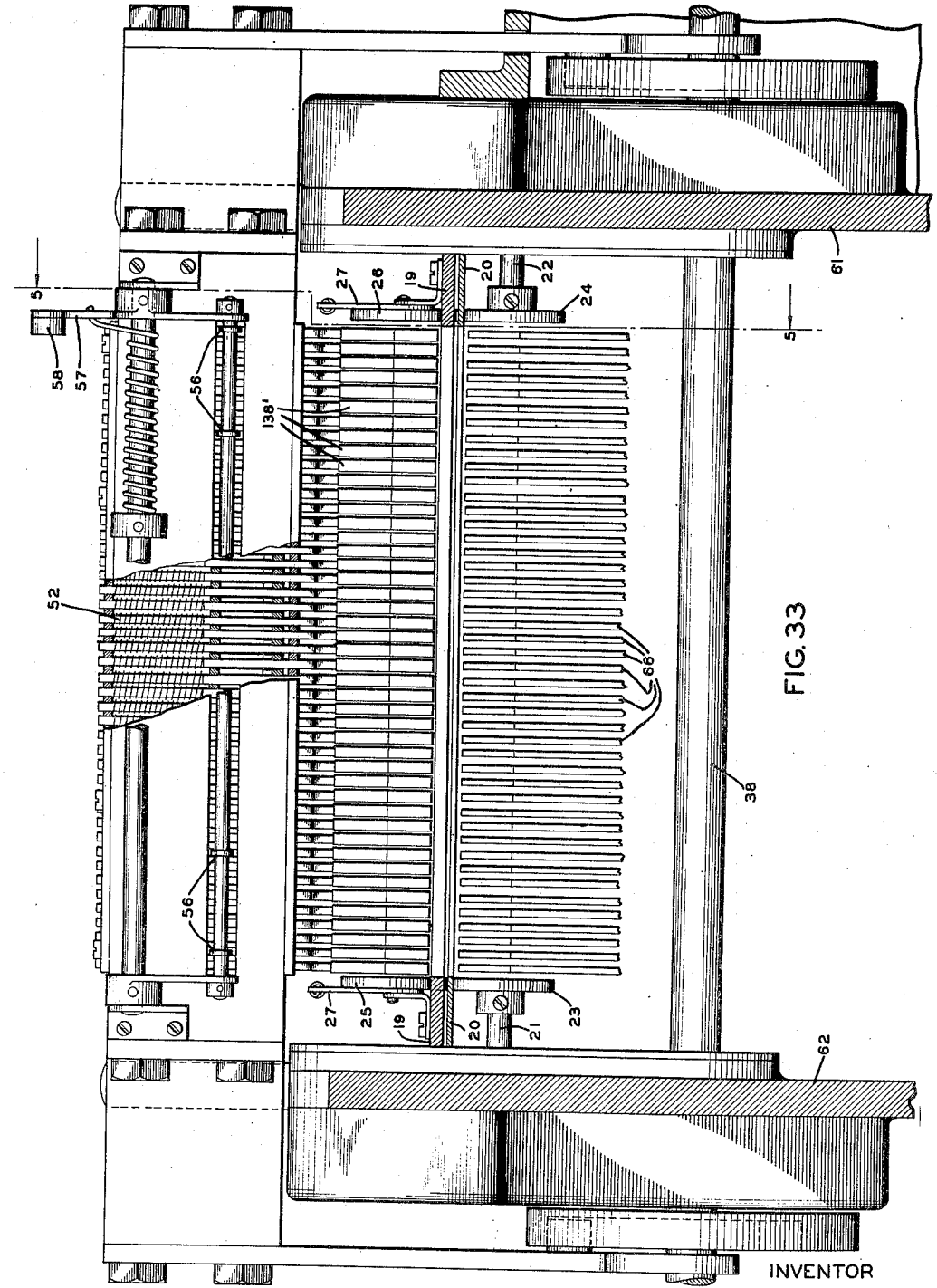

Fig. 33 is a side view, with parts broken away for the sake of clearness of illustration, showing details of the sensing head mechanism.

Figure 34:
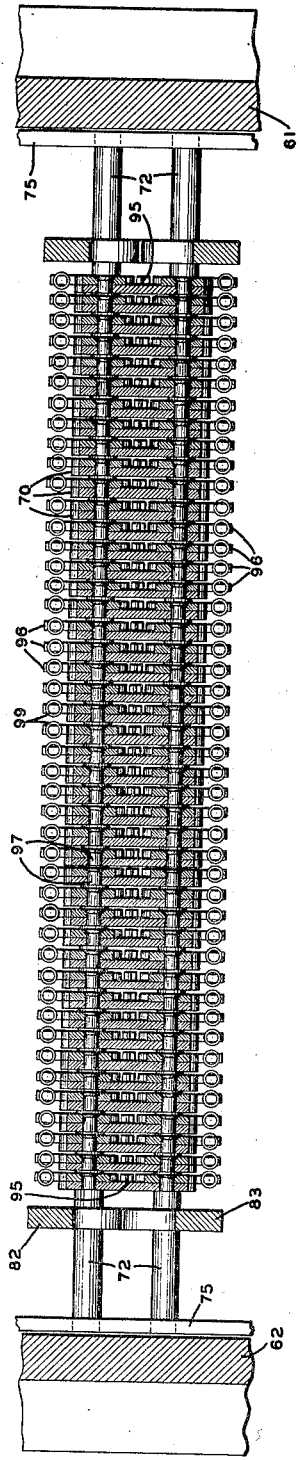

Fig. 34 is a sectional view, taken along line 34—34 of Fig. 10, showing details of construction.

Figure 35:
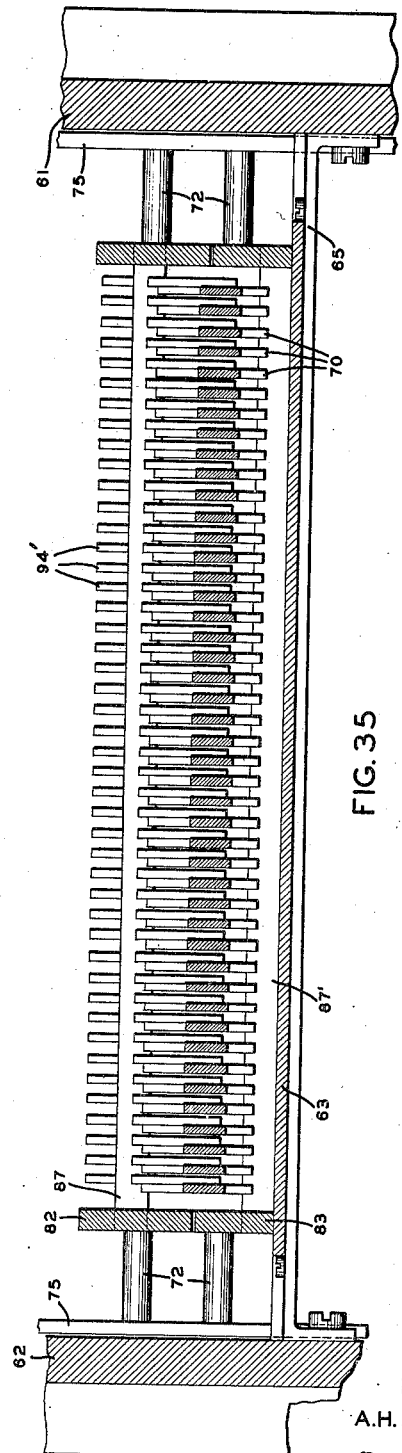

Fig. 35 is a sectional view, taken along the line 35—35 of Fig. 10, showing details of construction.

Figure 36:
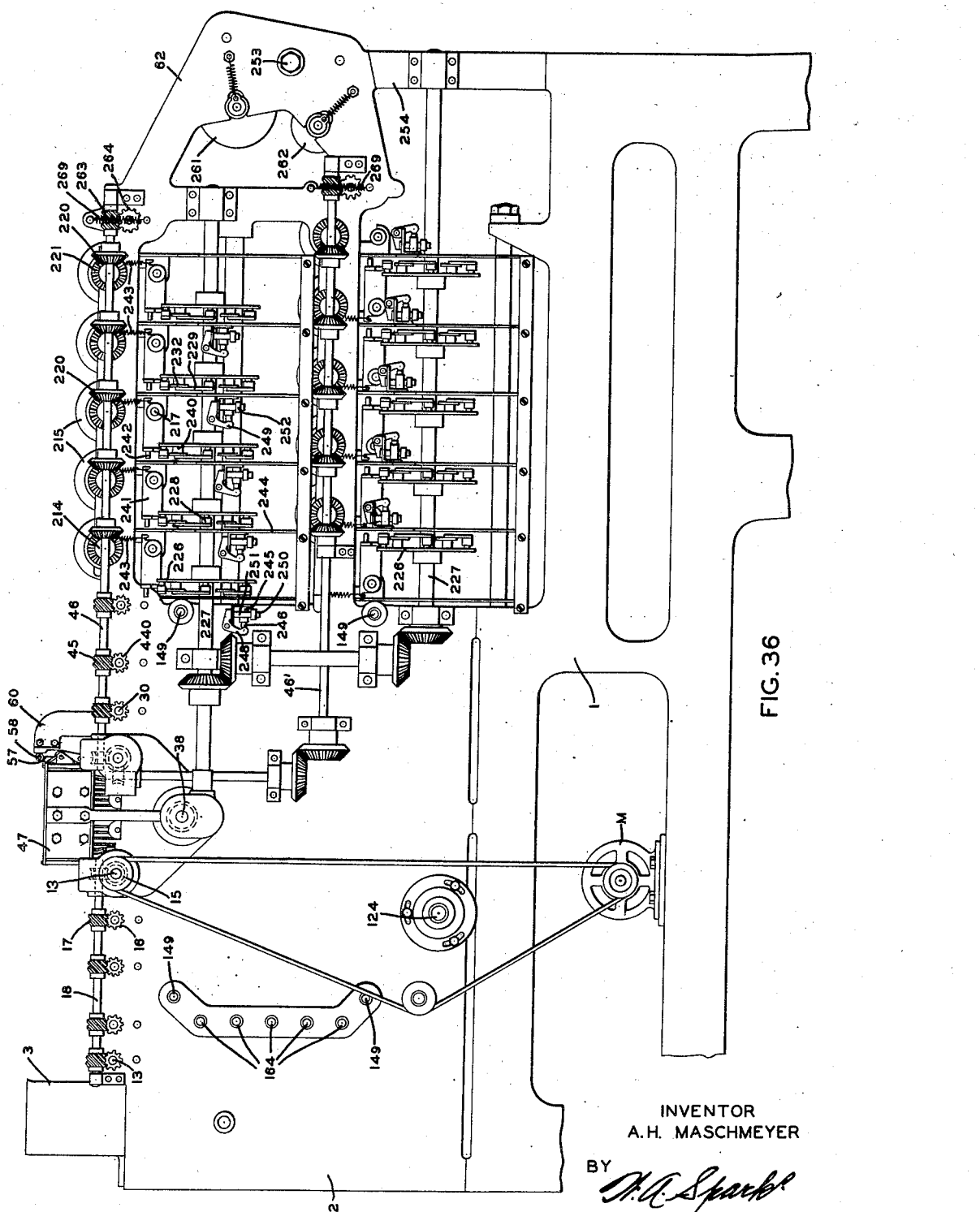

Fig. 36 is a side view showing various gear trains.

Figure 37:
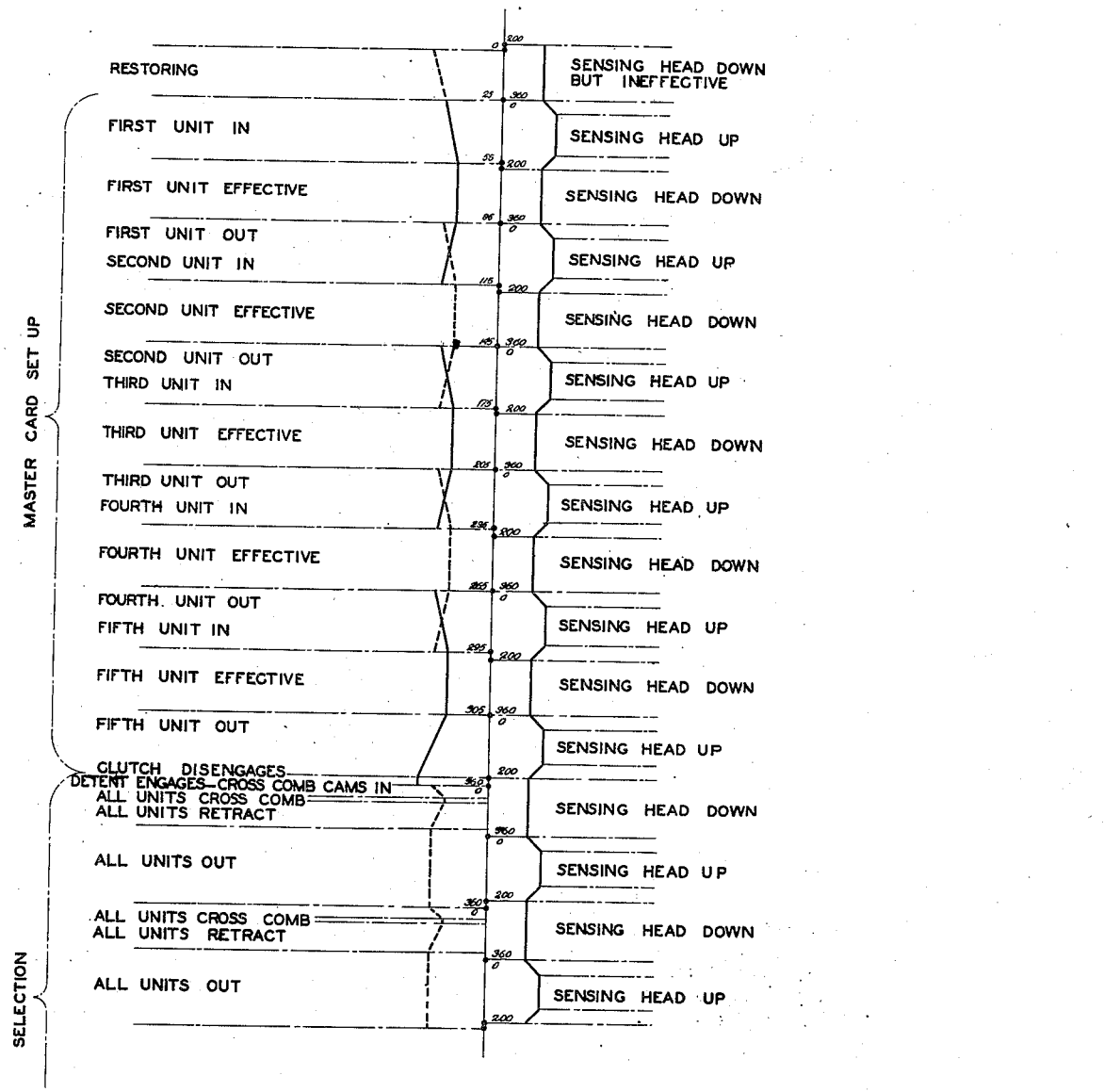

Fig. 37 is a chart showing the timing of certain operations of the machine.

Fig. 38 is a schematic view illustrating an alternative embodiment of the invention.

Fig. 39 shows a typical 90-column card used with the alternative embodiment of the invention.

Figure 40:
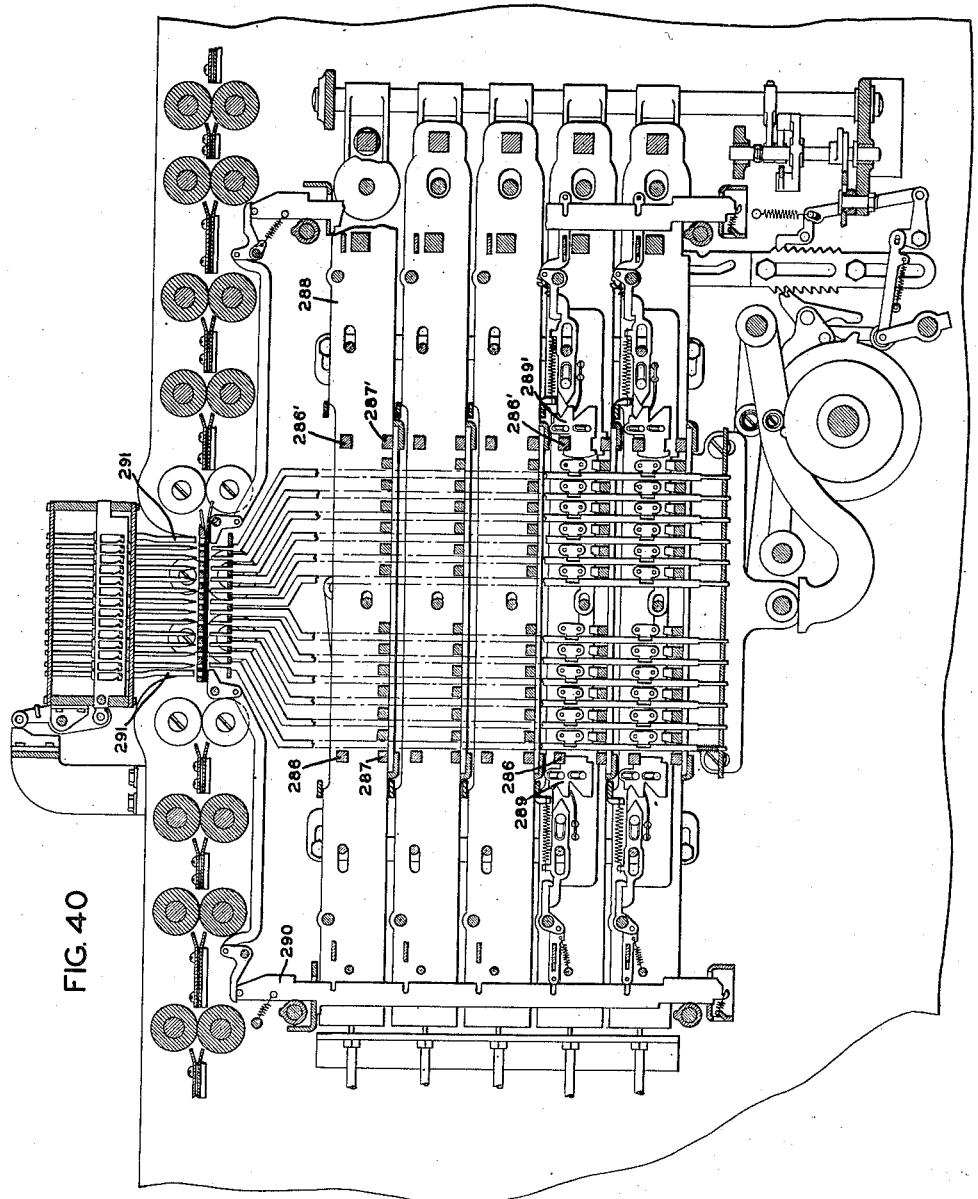

Fig. 40 is a sectional view, similar to that of Fig. 2, showing details of the alternative embodiment of the invention.

Figure 1:
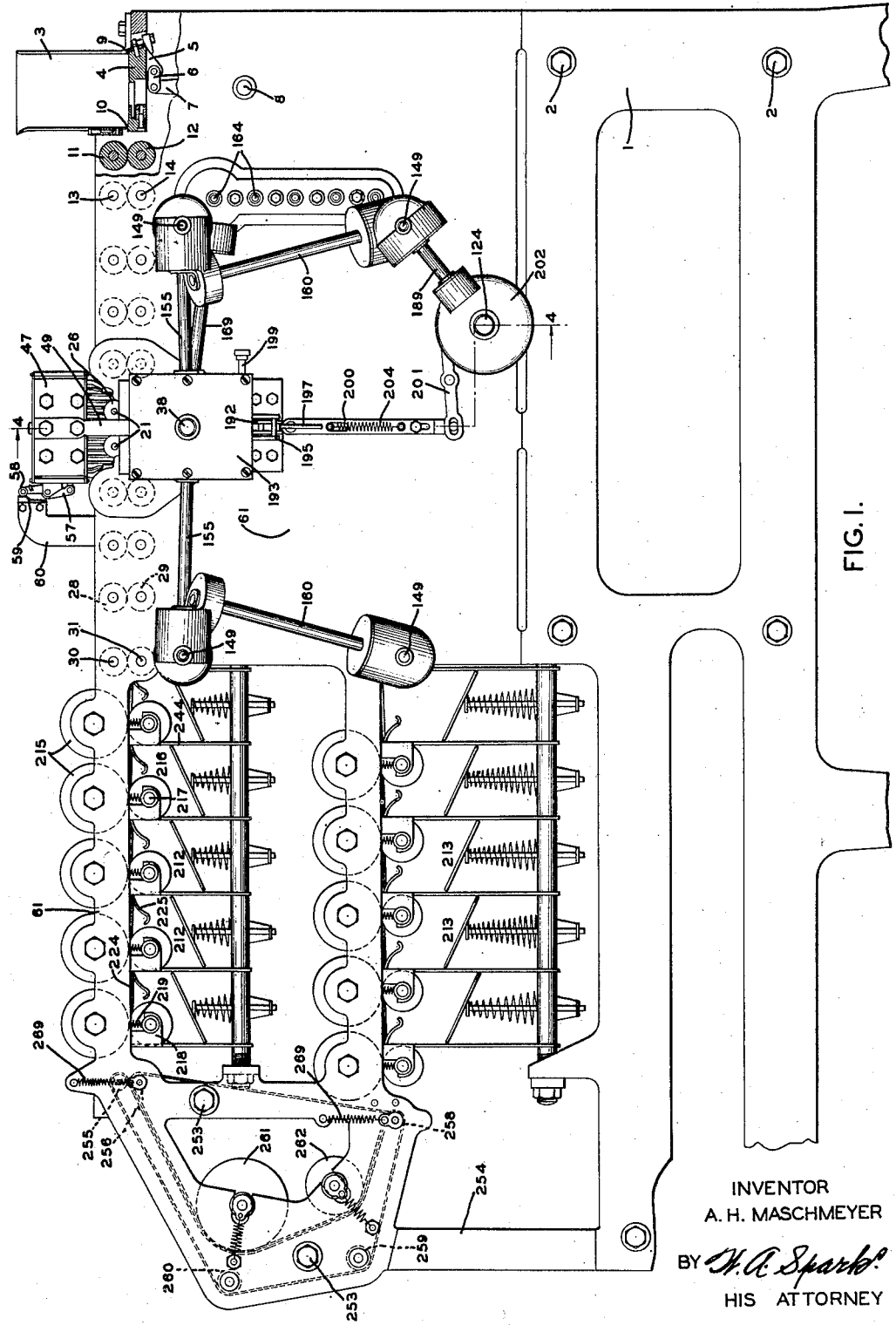

Referring to Fig. 1, there is shown a frame comprising end plates (not shown) and lower side walls 1 provided with supporting legs and held in substantial parallel vertical relation by tie rods 2. A card feeding means is mounted on this frame. This card feeding means may be of any suitable construction for successively advancing or projecting cards one at a time from a stack or other supply. It may, if desired, be the same as that shown in Letters Patent 1,315,370, dated September 9, 1919.

*Card feeding and card conveying mechanism*

Briefly described, the card feeding means comprises a magazine or hopper 3, rigidly mounted on the frame and adapted to support a pack or stack of horizontally disposed cards. This magazine is open at the bottom, and beneath it is arranged a reciprocating feeding block 4 mounted in suitable guides, and having on its under side a lug 5 connected by means of a link 6 to the upper end of a lever 7 rigidly mounted on a rock shaft 8, provided with suitable bearings supported in the upper side walls 61 and 62 (Fig. 4). The lever 7 is adapted to be reciprocated through linkage mechanism (not shown), which is actuated by means to be described later, whereby the block 4 is reciprocated across the lower part of the magazine. The block 4 is provided at its rear portion with a transverse picker blade 9 projecting a proper distance above the block 4 so as to extend behind, and be in a position to engage, the rear edge of the lowermost card of the stack contained in the magazine 3. The forward portion of the magazine is provided with a micrometer slot 10 so that when the block 4 is moved forward a card engaged by the blade 9 will be projected through this slot.

When the card is projected through the slot, it is received by a suitable transferring means which may consist of five pairs of frictionally engaged rollers 11 and 12, mounted on shafts 13 and 14 which are provided with suitable bearings in the side walls 61 and 62. One of the upper roller shafts 13 has mounted on it a grooved pulley 15 (see Fig. 36) which may be driven through a power belt and a suitable source of power, preferably an electric motor M. The drive just mentioned serves to rotate rollers 11 and 12 to present the cards successively to analyzing means for detecting the characteristics or designations which determine the sorting or classification of the cards. This drive is effected through helical gears 16 mounted on shafts 13 and helical gears 17 meshing with gears 16, and mounted on shaft 18.

In part, this analyzing means (see Figs. 5 and 33) comprises upper and lower plates 19 and 20 which are suitably supported by the side walls, and are suitably spaced to receive between them the cards to be analyzed. Beneath the plate 20 are arranged horizontal stub shafts 21 and 22, mounted in suitable bearings supported in the side walls 61 and 62 (see Figs. 4 and 33) and carrying feed rollers 23 and 24, the peripheries of which project through openings in the plate 20. Over the upper plate 19 are rollers 25 and 26 projecting through openings in this plate, and cooperating with the rollers 23 and 24. The rollers 25 and 26 are mounted on bell cranks 27, pivoted to a bracket secured to the plate 19, and springs (not shown), secured to the bell cranks on which corresponding pairs of rollers are mounted, hold the rollers 25 and 26 in frictional engagement with the rollers 23 and 24. These rollers engage each of the cards outside their perforated area and serve to feed out the cards from between the plates 19 and 20 at the proper time. When the card has been analyzed and is fed forward by the rollers 23 to 26, it is received between pairs of upper and lower transmission rollers 28 and 29 (see Fig. 1) which are mounted on shafts 30 and 31 having suitable bearings in the side walls 61 and 62. The card is moved forward by these rollers towards the receiving station or pocket which has been previously selected by the analyzing means to receive it. The feed roller 23 is driven by the pulley actuated roller shaft 13 through the gear train consisting of pinion 32 (Figs. 3 and 4) carried on shaft 13, a pinion 33 carried on the associated shaft 14 which meshes with the pinion 32 and with a pinion 34 carried on shaft 35, which pinion, in turn, meshes with a pinion 36 on the shaft 21. A gear 37 fixed to a main drive shaft 38 is driven by a pinion 36' which is fixed to shaft 35 and engages gear 37. The feed roller 24 is driven through gear 37, a pinion 39 carried on shaft 40 which meshes with gear 37, and a pinion 41 on shaft 40 which meshes with a pinion 42 carried on the shaft 22. The pair of transmission rollers 28 and 29 adjacent to the analyzer is driven from pinion 41 which meshes with a pinion 43 carried on shaft 31; this pinion meshing in turn with a pinion 44 carried on shaft 30. The upper roller shafts 30 are provided with pinions 440 meshing with gears 45 (see Fig. 36) mounted on shaft 46 which is driven from the roller shaft 13 adjacent to the analyzing device.

Master cards

Figure 7:
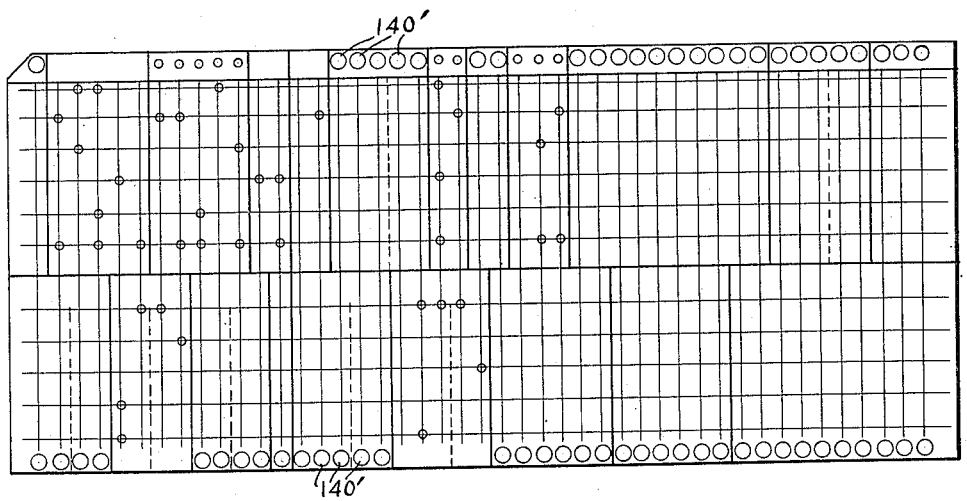
Fig. 7 illustrates a typical 90-column master card used in setting the machine.
Figure 8:
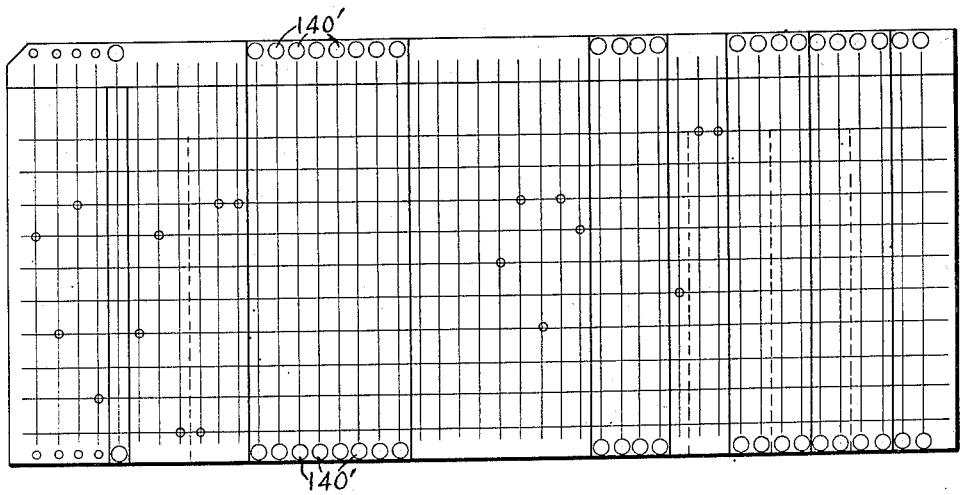
Fig. 8 illustrates a typical 45-column master card used for the same purpose.
Figure 14:
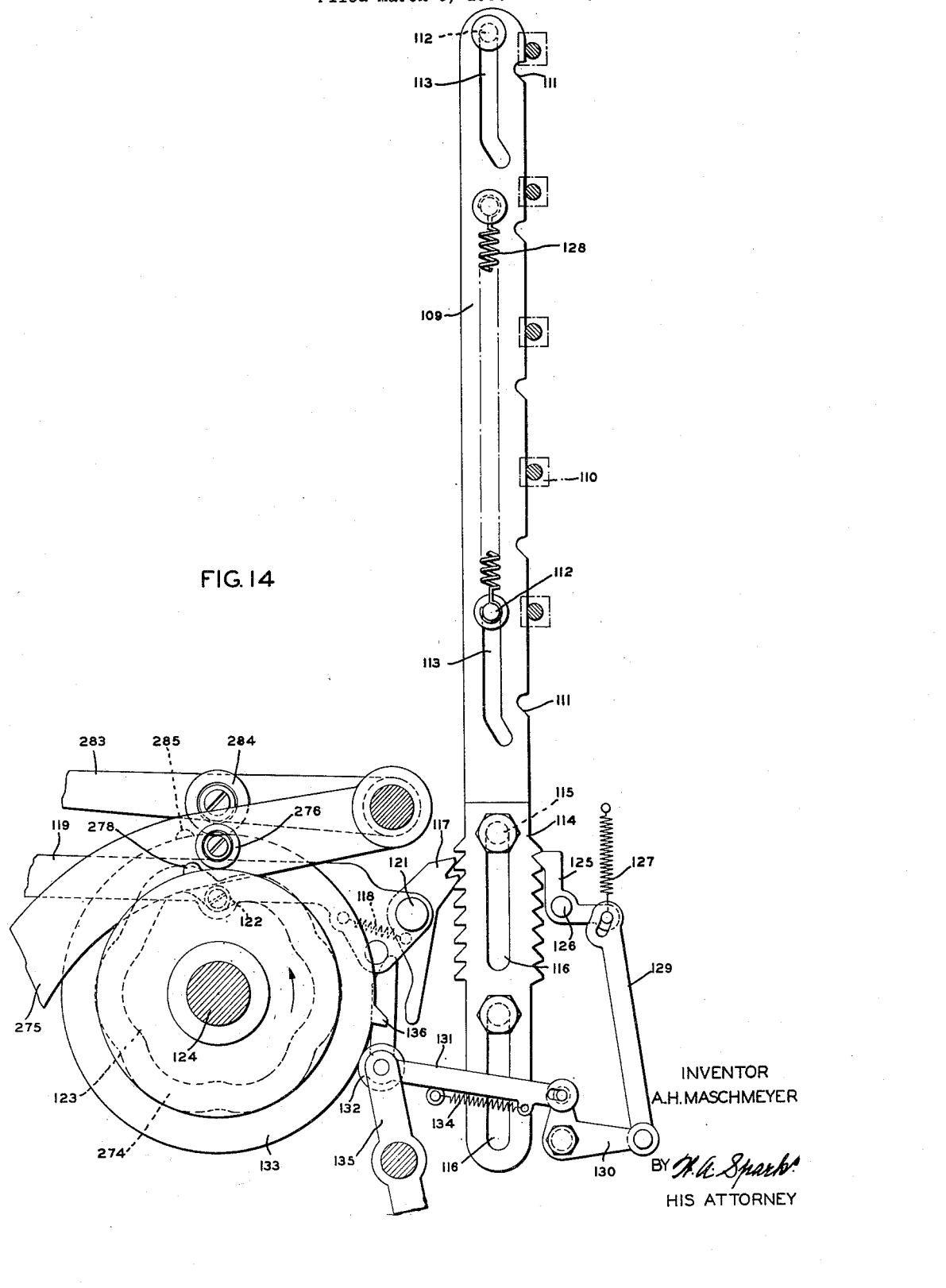
Fig. 14 is an enlarged view illustrating the section releasing mechanism, as shown in Fig. 2, with certain parts, which mask it in that figure, removed for the sake of clearness of illustration.
Figure 15:
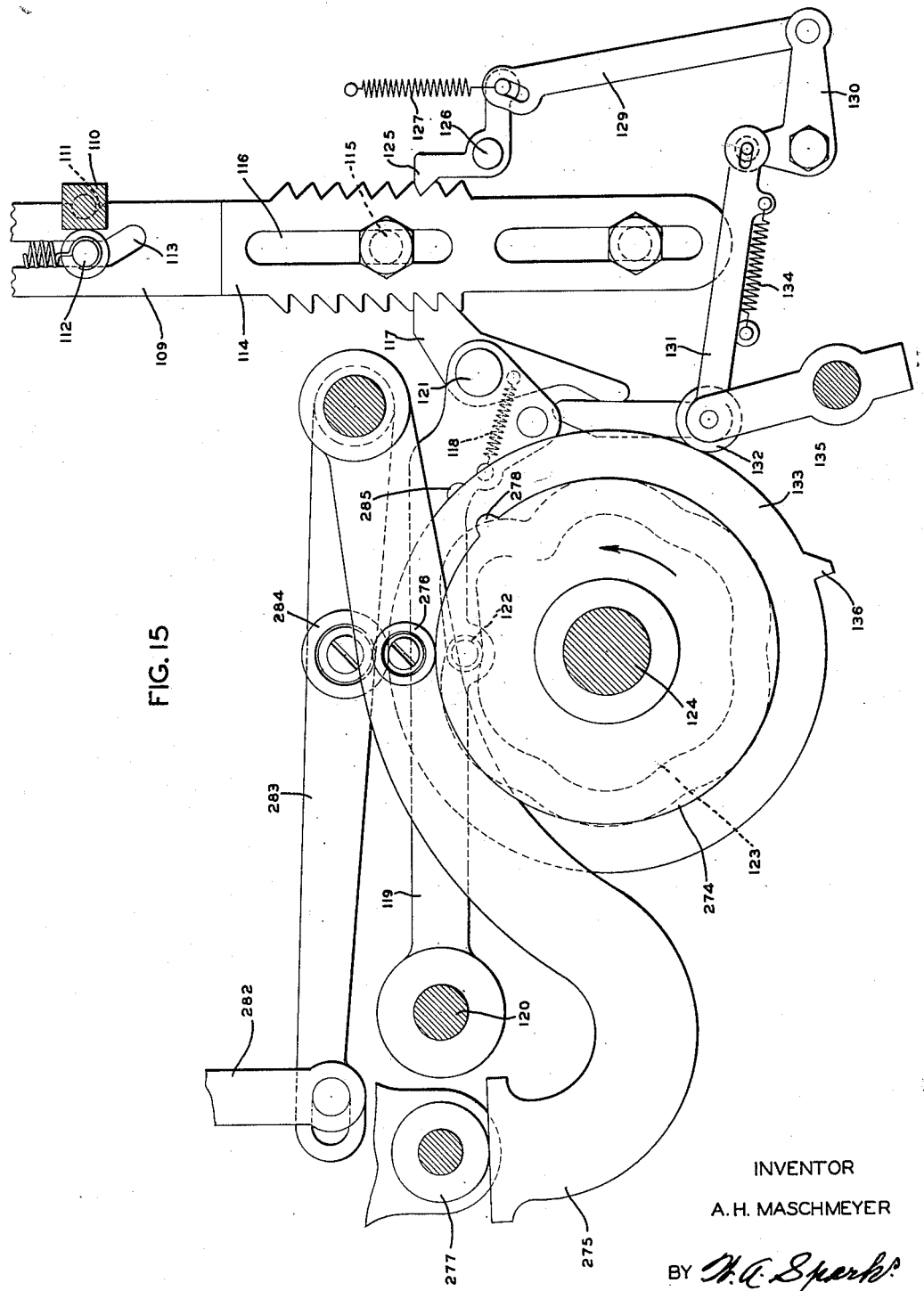
Fig. 15 is a sectional view, similar to that of Fig. 14, showing the section releasing bar in its operative and raised position.

Referring to Fig. 7, there is shown a master punched card for setting the machine of the present invention to select cards having a predetermined pattern, and to redistribute cards having another predetermined pattern. This card, which is a 90-column card, is divided into an upper zone containing columns 1 to 45, inclusive, and a lower zone containing columns 46 to 90, inclusive. Each zone is arbitrarily divided into fields, as indicated by the heavy vertical lines, in each of which the quantity of a given class of items, or any other record relating to a particular subject, is represented by perforations punched according to the 5-unit code illustrated in Fig. 9. Above columns 1 to 45, inclusive, and below columns 46 to 90, inclusive, there is a marginal area on the card in which perforations can be punched to predetermine the fields which are to be sensed in determining whether a card is to be selected or redistributed, and to predetermine the fields in which sensing is to be ineffective. In Fig. 8 there is shown a master punched 45-column card which differs from the 90-column card in that it is not divided into upper and lower zones and has an upper marginal area above, and a lower marginal area below each of the 45 columns. The upper and lower marginal areas of this card serve the same purpose as the similar areas in the 90-column card.

Sensing or analyzing device

Figure 6:
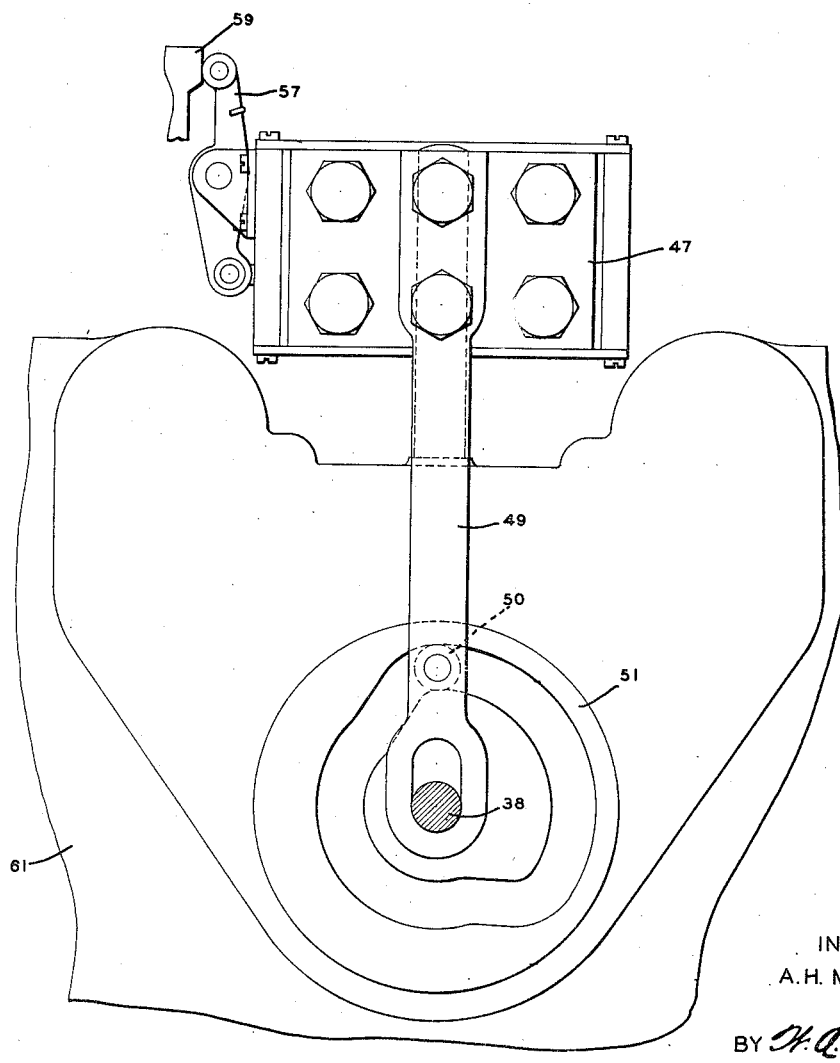
Fig. 6 is a section taken along the line 6—6 of Fig. 4, which shows the means for reciprocating the sensing head.

The analyzer or card sensing mechanism which determines the character or classification of the cards to be classified or sorted (see Figs. 5, 6 and 33) comprises, in addition to the plates 19 and 20, a pin box 47 which houses one end of pins 48. The pin box 47 is disposed above the plates 19 and 20, and is adapted to be vertically reciprocated by means of arm 49 (Fig. 6) which is provided with a cam follower 50 adapted to cooperate with a grooved cam 51 mounted on the main drive shaft 38. The pin box 47 is provided with rows of pins 48 which may be caused to register with corresponding rows of perforations in the plates 19 and 20. The pins 48 are yieldably pressed against perforated cards by springs 52. Upon finding a perforation in a card, a pin passes through the card during the downward motion of the pin box. The pins which find perforations in a card are moved positively upon the reciprocation of the pin head by latch 53 which is provided with fingers 54 adapted to engage studs 55 on the pins that have entered perforations. These fingers do not engage the studs on pins that have not entered card perforations. The fingers 54 of the latch are moved into and out of engagement with the studs on the pins 48 by means of a latch reciprocating mechanism. This mechanism comprises links 56 attached to the latch and connected to a spring-pressed rocking arm 57. This arm is provided at one end with a roller 58 adapted to cooperate with cam surface 59 on a standard 60 supported by the side walls 61 and 62. When the pin box 47 is lowered, the rocking arm 57 moves the latch 53 to the right, positively depressing pins 48 which have penetrated perforations in a punched card. When the pin box is raised, the rocking arm retracts the latch, allowing springs 52 to raise the previously locked pins.

Minor pin assembly

The casing (Figs. 1, 4, 28–32), including side plates 61 and 62 and suitable end plates (not shown) is divided into sections by a series of flat horizontal strips 63 (Figs. 2, 10 and 12) provided with recesses 64 (Fig. 11). The strips are supported by brackets 65 suitably attached to the side walls of the casing and the outside strips in each section are attached to the bracket, as shown in Fig. 35. Plungers 66, which correspond in number to the pins 48, are disposed in the recesses 64, serving to guide the movement of the plungers, and their lower ends are slidably mounted in openings in a frame 67 secured to the side plates of the casing. After the pins 48 pass through perforations in a card their continued movement causes them to depress plungers 66, but, when they are retracted, plungers 66 are restored to their raised position by the expansion of the restoring springs 68.

Each section is provided with minor pins 69, corresponding in number to the number of plungers 66. These pins are arranged in rows and half columns in the same manner as the cards (see Fig. 7). Half a column of minor pins is carried by each front minor pin carrier 70 (Fig. 13) and half a column by each rear minor pin carrier 71 (Fig. 13). These carriers are preferably disposed at right angles to the plane of the plungers 66, with the front carriers 70 of each section slidably mounted on rods 72 and 73, and the rear carriers 71 slidably mounted on rods 73 and 74. The rods 72 and 74 are mounted on restoring bars 75 (Fig. 25), the function of which will be described later, while the rods 73 are suitably mounted in the side walls of the casing, as shown in Fig. 31. The minor pin carriers 70 and 71 are thus adapted to be reciprocated in a plane at right angles to the plane of reciprocation of the plungers 66.

Each carrier is provided with pairs of resilient fingers 76 (Fig. 13) which hold an associated minor pin in a raised position when upper stud 77 on the pin is held between a gripping portion 78 of the fingers, and hold the minor pin in lowered position when this stud is held by the portion of the fingers below the gripping portion just mentioned. Each minor pin is provided with a lower stud 79 which is invariably gripped by the portion of the fingers last mentioned. Each minor pin is also provided with a lug 80 adapted to enter a corresponding notch 81 in the plungers 66. If the minor pin carriers of any section are moved toward the rear of the machine, or toward the left in the drawings, the lugs 80 of the minor pins in this section enter corresponding notches 81 in the plungers. When the plungers are subsequently depressed in accordance with the patterns on a punched master card, minor pins 69, corresponding to the depressed plungers are moved to their lower position where they are held by the resilient fingers 76. When the minor pin carriers in this section are afterwards moved towards the front of the machine or toward the right in the drawing, the restoring springs 68 elevate the plungers 66 which are then ready to set the minor pins of another section in accordance with the patterns on another punched master card.

The minor pins, mounted on each minor pin carrier, as 70 and 71, are adapted to control either an upper receiving station or pocket operating slide, as 82, by means of which a card pocket or receiving station in a group of selecting stations is prepared to receive a card or a lower receiving station or pocket operating slide, as 83, by means of which a card pocket or receiving station in a group of re-distributing stations is prepared to receive a card.

The pocket operating slide 82 is slidably mounted on rods 72, 74 and 85 (see Figs. 2, 28 and 30) and the slide 83 is slidably mounted on rods 72, 73, 74 and 85; the rod 85 being suitably attached to the side plates of the casing (see Figs. 28 and 30) and the rod 84 being attached to the pocket operating slides 82 and 83. The upper pocket operating slides in each section are rigidly connected by means of bars 86 and 87 (Fig. 2), while the lower pocket operating slides are rigidly connected by means of similar bars 86' and 87'. Each of the slides 82 is pulled toward the rear of the machine by means of an individual spring 88 having one end attached to the rod 85 and the other to a stud 89 fixed to the slide (see Figs. 2 and 28). Each of the slides 83 is pulled in the same direction by an individual spring 90 attached to a stud 91 on the slide and to a stud 92 fixed to the sideplates of the casing. The slides are normally held against movement under tension of these springs by means to be described later.

Means are provided for operatively associating any pocket operating slide, as 82 and 83, with either a front or a rear half column of any column of minor pins, or for operatively disassociating any slide from either half, or both halves, of any column of minor pins. Slidably mounted on studs 93 (Fig. 13) fixed to each pin carrier 71, is a latch member 94 having notches adapted to receive either the bar 86 connecting the upper pocket operating slides 82, or the bar 86' connecting the lower pocket operating slides 83. A spring 95, having one of its ends fixed, normally presses against a shoulder on the latch, thereby holding it locked with the bar 86. When the latch is in this position and the associated slide, as 82, is moved to the left under tension of the spring 88, the bar 86 abuts against a shoulder of the latch, thus moving the pin carrier to the left and causing the half column of minor pins carried thereby to sense associated plungers 66. If, on the other hand, the latching member is locked with the bar 86', the movement of the slide 83 to the left, under the influence of its spring 90, causes the bar 86' to move the pin carrier 71 to the left, again causing the half column of minor pins to sense the associated plungers 66. But, if the latching member is unlocked from both the upper and lower bars 86 and 86', the movement of either the slide 82 or 83 will cause no movement of the pin carrier 71 as the bars 86 and 86' are then free to move relatively to the pin carrier 71.

To unlock the latching member 94 from the upper bar 86, there is provided a selecting member 96 which is slidably mounted on a pin 97 fixed to the pin carrier 71 and on the rod 74. A trigger 98, pivoted on rod 85, normally holds the selecting member out of engagement with the latching member against the tension of a spring 99 suitably fixed to an arm on the selecting member and a fixed bar as shown. The trigger is normally held in engagement with a catch 100 on the selecting member, by a spring 101 having one of its ends attached to a stud fixed in the slide 83, and its other end attached to a releasing member 102 which is pivotally connected to the trigger. The releasing member is slidably supported on a bar 103 which is also one of the supports for the pocket operating slides, as 82 and 83.

When the releasing member 102 is moved to the right, the trigger 98 snaps from the catch 100 and this releases the selecting member 96 which then forces the latch member 94 downward against the tension of spring 95, thereby unlocking the latch from the upper bar 86. In a similar manner, when releasing member 105 is moved to the right, the trigger 106 causes the selecting member 96 to force the latching member downward into engagement with the lower bar 86'. Means similar to those described are also provided for unlocking a latch member 94' mounted on the pin carrier 70 from the upper bar 87 and locking it with the lower bar 87'. Means are provided for actuating any one of the releasing members 102, 105, associated with each pair of pin carriers 70 and 71, whereby any half column of minor pins can be operatively associated with either an upper pocket operating slide 82, or a lower slide 83, or any half column or any column of minor pins can be disabled with respect to either one of an associated pair of pocket operating slides. This actuating means will be described later.

*Section releasing mechanism*

As stated above, the pocket operating slides, as 82 and 83, of each section are normally prevented from moving to the left under tension of the springs, as 88 and 90. The means for preventing this movement includes a pair of section releasing bars 109, disposed adjacent to each of the side plates of the casing, and holding bars 110 (see Figs. 14 to 17). There is one of these holding bars for each section and they lie at right angles to the pocket operating slides in notches provided in both upper and lower slides which serve as guides for the bars and provide shoulders against which the bars abut. Each bar has a reduced cylindrical portion adapted to enter a corresponding notch 111 in the section releasing bars. The reduced portions of the holding bars normally abut against the edge of the section releasing bars, and when in this position the holding bars prevent movement of the pocket operating slides under tension of springs 88 and 90.

Means are provided for raising the section releasing bars step by step to enable successive holding bars, beginning with the one uppermost, to enter the notches 111 in the section releasing bars. The lateral movement permitted the pocket operating slides of a section when the associated holding bar enters a notch on each section releasing bar is sufficient to cause the lugs 80 on all the minor pins 69 of the section to engage the notches 81 of the plungers 66, thereby conditioning the minor pins to be set in accordance with the patterns on a punched master card. Each section releasing bar is supported by studs 112 which are fixed to the side plates of the casing and extend through slots 113 provided in the bar, and is adapted to be raised by a ratchet bar 114 supported by stud bolts 115 which are threaded into the side plates of the casing and extend through slots 116 of the ratchet bar. A stepping pawl 117, held in engagement with the teeth of the ratchet bar by a spring 118, is adapted to be actuated by a lever arm 119 which has its fixed end pivoted to a shaft 120 secured to the side plates of the casing and its free end pivoted by a pin 121 to the stepping pawl. A follower 122, supported on the lever arm, cooperates with a grooved cam 123 on a main cam shaft 124 which is journaled in the side plates of the casing (see Fig. 4), and is driven in a manner which will be described later. A stop pawl 125, pivoted on a stud 126, fixed to the side plate and held in engagement with the ratchet teeth by a spring 127, serves to prevent the section releasing bar from being restored to its lowered position by the tension of a spring 128, having one end fixed to a pin on the bar, and the other fixed to the supporting stud 112.

A tripping mechanism is provided for disengaging the stepping and stop pawls from the ratchet teeth when the section releasing bar is to be restored to its lowered position. The stop pawl is connected by a pin and slot connection to one end of a link 129, the other end of which is pivotally connected to an elbow member 130. This member is pivoted on a stud secured to the side plate of the casing and is connected to a rocking member 131 by a pin and slot connection. A follower 132 is supported on the rocking member and cooperates with a tripping lug 136 which is on the periphery of the cam 133. The follower is held in engagement with the cam by a spring 134, while a J-shaped member 135 has its short arm, pivoted to a stud secured to the side plate of the casing, and pivotally connected to the rocking member 131 and its long arm arranged to hold the stepping pawl out of engagement with the ratchet teeth when the stepping pawl is tripped.

Upon the rotation of cam 123 the stepping pawls 117 raise the ratchet bars 114 and section releasing bars 109 step by step. This cam is so designed that the section releasing bars 109 are stepped five successive times at suitable intervals during one revolution of the main cam shaft 124. When the bar 109 takes the first step, the uppermost holding bar 110 enters the first notch in the bar 109, thus conditioning the minor pins in the uppermost or first section to be set by the plungers 66. The minor pins are then selectively moved to their lower position when the plungers 66 are depressed in accordance with the pattern of a punched master card detected by the pins 48. This operation takes place before the bar 109 takes the next step. When the bar 109 takes this step, the uppermost bar 110 is withdrawn from the first notch 111, and the pocket operating slides, as 82 and 83, and the pin carriers, as 70 and 71, in the first section are moved to the right and restored to their normal position with the minor pin lugs 80 disengaged from the notches 81 of the plungers 66.

Figure 17:
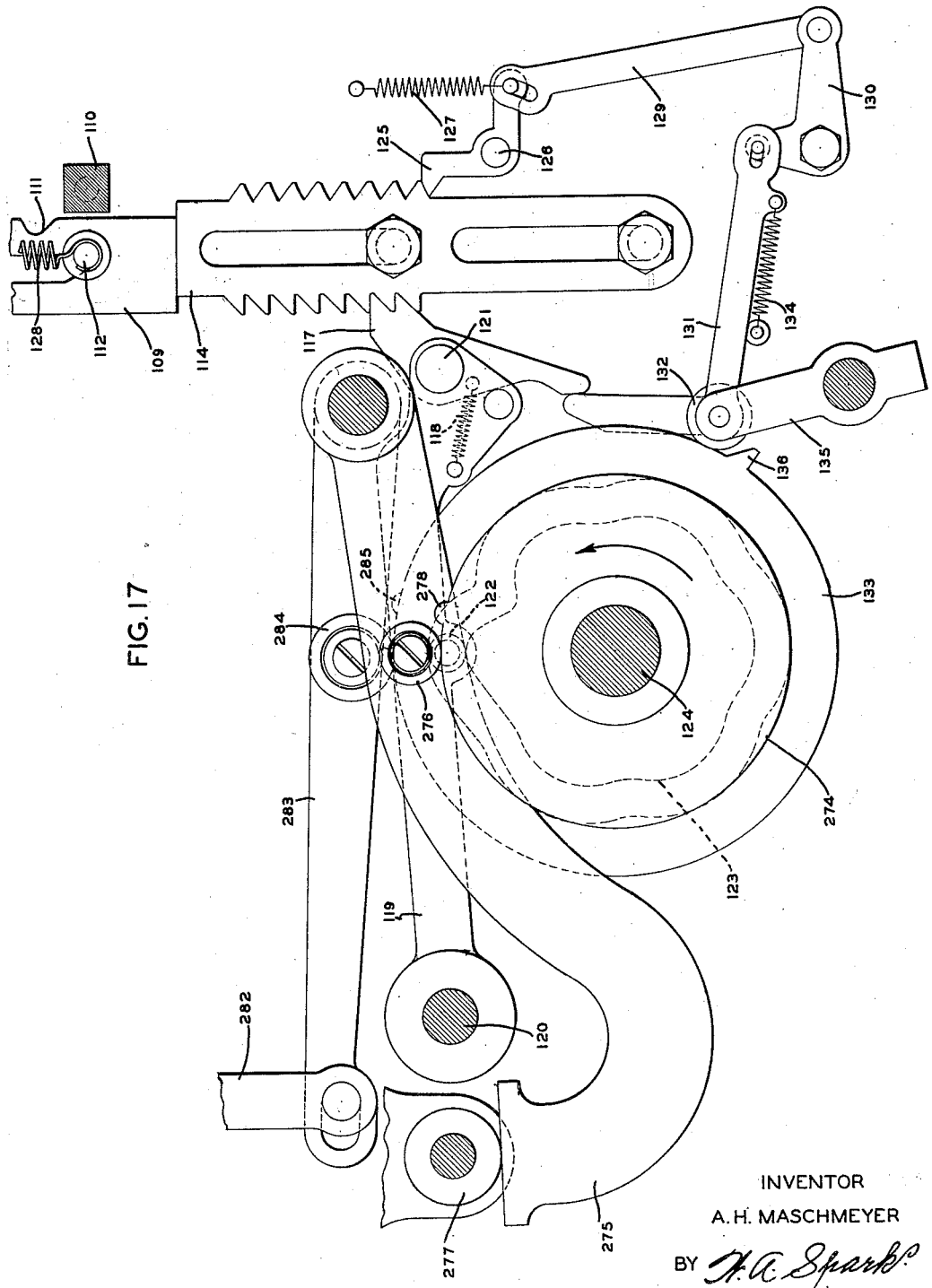
Fig. 17 is a sectional view, similar to that of Fig. 14, showing a position of the section releasing bar in which the pocket operating slides are released from control of the bar.

When the second holding bar 110 enters the second notch 111, the minor pins of the second section are set in accordance with the pattern of another punched master card. In a similar manner the minor pins of the remaining three sections are successively set in accordance with the patterns on successive punched master cards as the section releasing bars are raised step by step. This operation of setting the minor pins in the several sections may be termed the storing, or the pattern storing, operation and will be thus referred to in the following description. This upward movement is limited by the studs 112 and the lower ends of the slots 113. At the termination of the upward movement the studs are forced into the lower curved portions of slots 113, moving the bars 109 to the left, as shown in Fig. 17, out of engagement with the holding bars 110. Before this takes place the pocket operating slides, as 82 and 83, which are held against the tension of springs, as 88 and 90, by the cooperation of the holding bars and the section releasing bars are placed under the control of other means to be described later. At the time the section releasing bars are moved away from the holding bars, the main cam shaft 124 is disconnected from the main drive shaft and locked in a fixed position in a manner to be described later.

The speed ratio between the main drive shaft 38 and the main cam shaft 124 is preferably six to one. This speed ratio is arrived at in the following manner:

The minor pins on each of the five sections must be set during one revolution of the main cam shaft. This requires five complete cycles of reciprocation by the sensing head 47 and these five cycles take place during five revolutions of the main drive shaft. The extra revolution of the main drive shaft is required by the fact that the sensing head is lowered during the preliminary restoring operation, as will be explained later, and is raised after the last or fifth section of minor pins have been set. This entire matter will be explained in more detail later, but at this point, reference to the chart of Fig. 37 will show the necessity of the speed ratio mentioned between the main drive shaft and the main cam shaft. It is to be understood that when more sections are added to the machine, the speed ratio mentioned may be changed accordingly.

When the machine is to be restored in a manner that will be described later, the main cam shaft 124 is re-connected to the main drive shaft 38. When this occurs, the trip lug 136 on the bumper cam 133 bumps the follower 132, whereupon the long arm of the J-shaped member 135 moves the stepping pawl 117 out of engagement with the teeth of the ratchet bar, and actuates the tripping mechanism to trip the stop pawl 125. While the pawls are thus disengaged, the springs 128 restore the section releasing bars and ratchet bars to their lowest position. The studs 112 are consequently forced out of the curved lower portions of slots 113, thus causing the holding bars 110 to re-engage the edge of the bars 109. The sections are thus prepared to be again sequentially released as the section releasing bars are stepped.

*Card pocket or station selecting mechanism*

At the time the minor pins of each section are set in accordance with the patterns of the punched master cards, pocket selecting bars 137 and 137' (see Figs. 2, 10 and 12) are positioned in a manner now to be described, to associate any half column of minor pins with either of two pocket operating slides, as 82 and 83, or to disable any half or full column of minor pins by disassociating them from both such slides. At opposite ends of each column of pins 48 and associated with a half column of pins (Fig. 5) is a double pin comprising an outer pin 138' and an inner pin 138 having its head enclosed within the outer pin. Disposed opposite each double pin is a bell crank 139 which is pivoted on a shaft 139' rigidly fixed to the side plate of the casing. At its upper end each bell crank is provided with a recess 140 adapted to receive an inner pin 138 but too small to receive an outer pin 138'. A link 141, associated with each bell crank, has one of its ends pivotally connected to the lower end of the bell crank 139 and its other end similarly connected to another bell crank 142, pivoted on a rod 142', secured to the side plate of the casing (see Fig. 30). Each bell crank 142 has an arm resting on a pin in the upper end of one of the pocket selecting bars 137 and 137' which are disposed at opposite ends of the machine. Each bar extends through a slot in one of the brackets 143 and 144 (Fig. 2) which are secured to the side plates of the casing. These slots are wide enough to permit lateral reciprocation of the bar. Each bar is normally held in raised position and in engagement with the arm of a bell crank 142 by an upper spring 145 and a lower spring 146. A shoulder 147 on each pocket selecting bar cooperates with the bracket 143 to limit the upward movement of the bar. There is a pocket selecting bar 137 for each rear half column of minor pins and another bar 137' for each front half column of minor pins, as is shown in Figs. 28 and 30, and each bar is common to corresponding half-columns of minor pins in the several sections, as is shown in Figs. 2, 10 and 12. A pair of bumper cams 148 cooperates with the pocket selecting bars 137 and 137' (see Figs. 10, 12, 28 and 30). One of these cams is disposed adjacent to the lower end of the pocket selecting bars and the other adjacent to their upper end. These cams, which serve to effect lateral reciprocation of the pocket selecting bars, are mounted on shafts 149 journaled in the side plates of the casing and driven in a manner to be described later.

When one of the double pins senses a large perforation 140' (Figs. 7 and 8) in either the upper or lower marginal areas of a master card, both the outer pin 138' and the inner pin 138 enter the perforation. As neither outer pin 138' can enter the recess 140 of the bell crank 139, the bell crank is depressed as soon as the outer pin engages it. When either double pin senses a small perforation in the original area of the master card, the outer pin is arrested by the card (see Fig. 5), but the inner pin 138 penetrates the perforation, after which it enters the recess 140 of bell crank 139 but depresses the bell crank only when it reaches the bottom of the recess. The inner pin thus depresses the bell crank through only half the distance that it is depressed by the outer pin.

Each pocket selecting bar is provided with spaced notches 150 and each releasing member, as 102 and 105, is provided at its free end with a pin 151. These pins are normally set by the movement of bars 82 and 83 out of engagement with the associated pocket selecting bars, as is shown in the uppermost section in Fig. 12, but whenever a particular section is selected, that is, whenever the minor pin carriers, as 70 and 71, of the section are moved to the left under tension of springs, as 89 and 90 through the medium of bars 82 and 83 and 86 and 86', the releasing members, as 102 and 105 are likewise moved to the left, whereupon the pins 151 are placed in operative relation with the pocket selecting bars. When a small perforation in the marginal area of a master card which is associated with a particular half column is sensed by a double pin 138', notch 150 is moved opposite the pin 151 on the upper releasing members 102 in the selected section, while the pins 151 on the lower releasing members 105 in this section, which are normally opposite a notch 150, are in a position opposite the edge of the associated pocket selecting bars. After this takes place, the bumping cams 148 reciprocate the pocket selecting bars laterally, releasing the trigger 106 and associating the corresponding half column of minor pins with the lower pocket operating slide 83. When a large perforation in the marginal area of a punched master card is sensed by a double pin (Fig. 10) the pocket selecting bar is moved to a position in which, the pin 151, on an upper releasing member 102 in the selected section is opposite the edge of the bar, and the pin 151, on the associated lower releasing member 105, is opposite a notch 150 in the bar. When the bar is then reciprocated laterally, the upper trigger 98 is released, thereby disassociating the corresponding half column of minor pins from an upper pocket slide, as 82. By the means just described any half column of minor pins may be selectively associated with either an upper or a lower pocket operating slide, as 82 or 83. By releasing the upper trigger 98 alone, any half column, or by releasing both the upper triggers 98, any full column of minor pins may be operatively disassociated from both the corresponding upper and lower pocket operating slides.

The shafts 149, on which the upper bumping cams are mounted, are provided with bevel gears 153 (Fig. 3) which mesh with bevel gears 154 mounted on one end of the shafts 155, and bevel gears 156, mounted on the other ends of these shafts, mesh with a bevel gear 157 mounted on the main drive shaft 38. The shafts 149, on which the lower bumping cams 148 are mounted, are provided with bevel gears 158, which mesh with bevel gears 159 mounted at one end of shafts 160 and bevel gears 161, on the other end of these shafts, mesh with bevel gears 162 mounted on the shafts 155. The upper and lower bumping cams 148 are thus driven from the main drive shaft 38.

*Pattern comparison mechanism*

Figure 21:
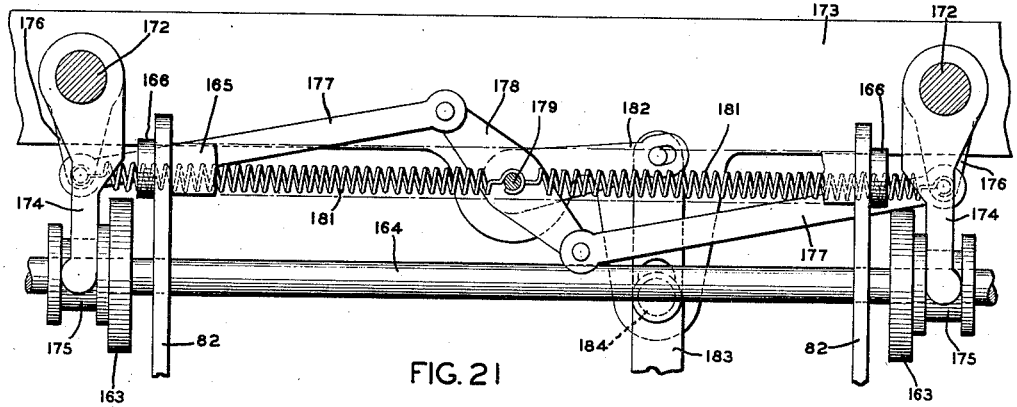
Fig. 21 is a sectional view, taken along lines 21—21 of Fig. 20, with certain parts removed for the sake of clearness of illustration, which shows details of the section releasing cam control mechanism.

Before the section releasing bar 109 is moved out of engagement with the holding bars 110, the pocket operating slides, as 82 and 83, are placed under control of other means, which will now be described. Common to the pocket operating slides, as 82 and 83, of each section is a pair of section releasing cams 163 (see Figs. 2, 20, 21 and 30). These cams are mounted at opposite ends of a shaft 164 journaled in the side plates of the casing, as shown in Fig. 30. There is a pair of these cams for each of the several sections, as is also shown in Fig. 30, and likewise common to the pocket operating slides of each section is a holding bar 165. These bars lie between the upper and lower pocket operating slides 82 and 83 in notches provided on each bar, and at right angles to the pocket operating slides. These holding bars each carry a pair of rollers 166 which cooperate with as associated pair of cams 163 (Figs. 2 and 21). When the rollers 166, common to the pocket operating slides of a section, reach the low portion of the cams 163, these pocket operating slides are moved to the left under tension of springs, as 88 and 90, upon which the minor pins of the section sense the plungers 66, but, when the rollers reach the high portion of the cams 163, the pocket operating slides of the section are moved to the right and the minor pins of the section are restored to their normal position, out of engagement with the plunger 66.

Figure 3:
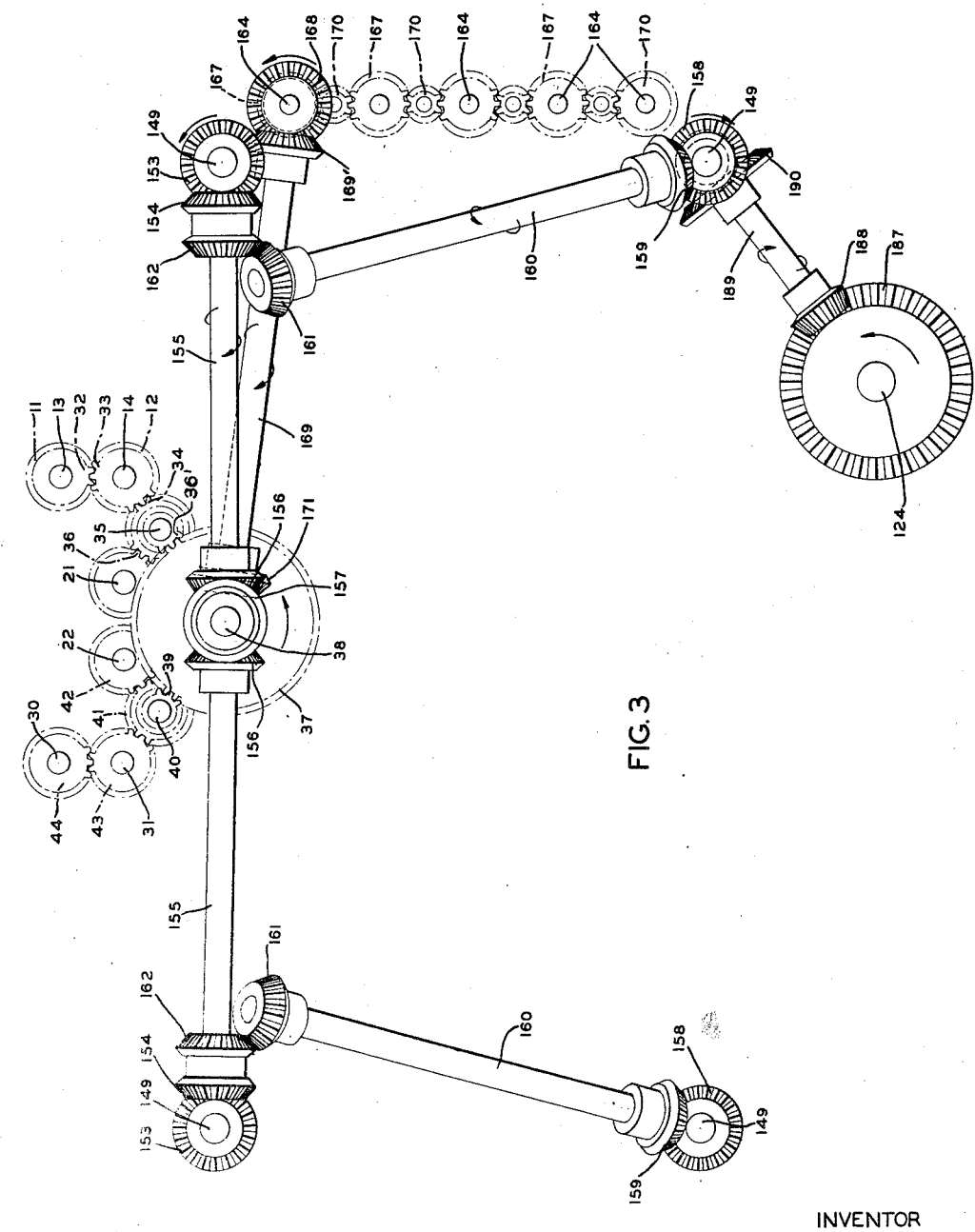
Fig. 3 is a schematic view showing the gear train employed in driving the machine.

Referring to Fig. 3, the shafts 164 on which the cams 163 are mounted are provided with gears 167 and these gears are interconnected with one another by pinions 170, which are mounted on spindles pivoted in the side plates of the casing. A bevel gear 168 mounted on the uppermost shaft 164 meshes with a gear 169' mounted on shaft 169, and a gear 171 mounted on the other end of shaft 169 meshes with bevel gear 171' (Fig. 4) on the main drive shaft 38. The cams 163 are thus arranged to be continuously driven from the main drive shaft 38.

Means are provided for operatively associating the rollers 166 with the cams 163 before the pocket operating slides are released from control of the section releasing bars 109 and for operatively disassociating the roller from the cams after the pocket operating slides are again placed under control of the section releasing bars. This operation is required by the fact that the cams 163 are continuously driven while the machine is in operation, and accordingly they must be disengaged from their associated rollers when the pocket operating slides are placed under control of the section releasing bars 109.

Adjacent the cams 163 at each end of the shafts 164 and at right angles to these shafts, are rods 172 (Figs. 20 and 21) which are rotatably mounted in brackets 173 secured to the side plates of the casing. Attached to each rod is a fork 174 which extends between annular rings on the collar 175. Each collar has integral with it a cam 163 and is slidably keyed to the shaft 164, as shown in Fig. 20. Accordingly when the forks 174 are rocked by the shaft 172, the cams 163 are moved into and out of engagement with their associated rollers 166.

The shafts 172 are rocked, in turn, by a cam-controlled linkage mechanism, which will now be described in connection with Figs. 20 and 21. Attached to each shaft 172 is a rocking member 176, which is pivotally connected to a link 177; this arm being, in turn, pivotally connected to a lever 178 mounted on a spindle 179 pivoted in bracket 173 and in a bracket 180 secured to a side plate of the casing. Springs 181, connected to the rocking members 176 and to the spindle 179, tend to hold each cam 163 in engagement with its associated roller 166. Another rocking member 182 having one end secured to the spindle 179 has its other end provided with a slot in which is positioned a pin secured to one end of a link 183. In the shank of the link, there is provided a slot through which a stud 184 extends, this stud being secured to bracket 173 and being adapted to guide the movement of the link; and in the end portion of the link there is provided another slot through which the main cam shaft 124 extends. A follower 185, carried on the link 183, cooperates with the cam 186, mounted on the main cam shaft. When the follower rests on the dwell surface of its cam, the cams 163 are held out of engagement with the rollers 166 against the tension of springs 181, but, when the follower enters the depressed portion of the cam surface, the lever 183 rocks spindle 179, whereupon rocking members 176 rock shafts 172, causing the forks 174 to move the cams 163 into engagement with rollers 166 against which they are held by spring 181. The pocket operating slides in the several sections are thus placed under control of the cams 163. As previously stated, this operation takes place while the pocket operating slides are still under the control of the section releasing bars. When the follower reengages the dwell surface of the cam 186, the cams 163 are disengaged from rollers 166, and the pocket operating slides are thus released from control of the cams 163 and are placed under the exclusive control of the section releasing bars 109. As previously stated, this operation occurs after the pocket operating slides have been placed under control of the section releasing bars.

*Automatic changeover from the pattern storing operation to the pattern comparing operation*

Means are provided for connecting the main cam shaft 124 to the main drive shaft 38 at the beginning of the pattern storing operation and for disconnecting it therefrom prior to the beginning of the comparison operation. Referring to Figs. 3, 4, 18 and 22, a bevel gear 187 mounted on the main cam shaft meshes with the bevel gear 188 mounted at one end of the shaft 189, which has mounted on its other end a bevel gear 190 meshing with a bevel gear on shaft 149. Shaft 149 is driven as previously described from the main drive shaft 38. On the main drive shaft, intermediate the shafts 155 and 169, as shown more clearly in Fig. 4, there is provided a clutch 191 which is adapted to connect and disconnect the shafts 155, but not the shaft 169, from the main drive shaft. This clutch is adapted to be actuated by a yoke 192. This yoke is attached to the movable member of the clutch and pivoted to a stud secured to the side plate of a casing 193, which is supported on the side wall 61. The yoke is adapted to be actuated by a trigger member 194 to connect the shafts 155 to, and disconnect them from, the main drive shaft 38. The trigger 194 is slidably mounted on a bracket 195 by means of a pin secured to the bracket and extending through a slot on the trigger. The bracket just mentioned is supported by the casing 193. The yoke 192 is normally held by the trigger. This is effected by means of a pin secured to the yoke which is held against a shoulder 196 on the trigger by means of two springs, one of which is secured to the trigger and bracket and the other of which is secured to the yoke and bracket. When the yoke is thus held, the clutch members are connected and the shafts 155 are driven by the main driving shaft 38. But when a bell crank 197, pivoted on a bracket supported by the side wall, is actuated, the trigger 194 moves the yoke 192 to the right, disengaging the clutch members and disconnecting the shafts 155 from the main drive shaft. As the trigger member moves to the right, a pin, attached to the bracket 195, rides over a shoulder 198 on the trigger, thereby raising the trigger from its pin-held position and releasing the yoke. By this time, a spring-pressed plunger 199 (Fig. 22), slidably mounted in the casing 193 and normally resting against the face of the yoke, has been forced behind the yoke as it advances to the right, and, when the yoke is released, it is held by the plunger 199.

To reengage the clutch members, this plunger is pulled out, and upon the restoration of the bell crank 197 to its normal position, the pin attached to the yoke reengages the shoulder 196 and the yoke is again locked by the trigger.

The bell crank 197 is adapted to be controlled by the cam 1991 mounted on the main cam shaft 124. A bar 200, slidably mounted on the side wall 61, is provided with a slot into which one end of the bell crank 197 extends. The lever 201, pivoted to a pin secured to the side wall 61, extends through an opening in the casing 202 enclosing the cam 1991. One end of this lever is pivotally connected to the bar 200 and the other end is provided with a follower 203, which cooperates with the cam 1991 and is held in engagement therewith by a spring 204 secured to the bar 200 and to a pin attached to the side wall 61. When the follower reaches the depressed portion of the cam, the spring 204 raises the bar 200, whereupon the bell crank 197 disengages the clutch members, which, in turn, disconnects the shafts 155 from the main drive shaft 38.

*Main cam shaft locking mechanism*

Means are provided for locking the main cam shaft 124 when the shafts 155 are disconnected from the main drive shaft 38. Referring to Figs. 4, 18 and 19, a casing 205, secured to the side wall 62, contains a locking plunger 206, which is keyed to the main cam shaft 124 and at one end is provided with a roller 207. The roller is pressed against the inner end of the casing 205 by a spring 208 disposed between one end of the casing and an annular face plate 209, covering one face of the bearing 210. When the clutch 191 is released, the roller 207 is spring forced into a recess 211, provided in the inner surface of the casing 205, whereupon the main cam shaft is locked against further rotation with the cams substantially in the position shown in Fig. 18.

*Card pocket or receiving station mechanism*

Figure 24:
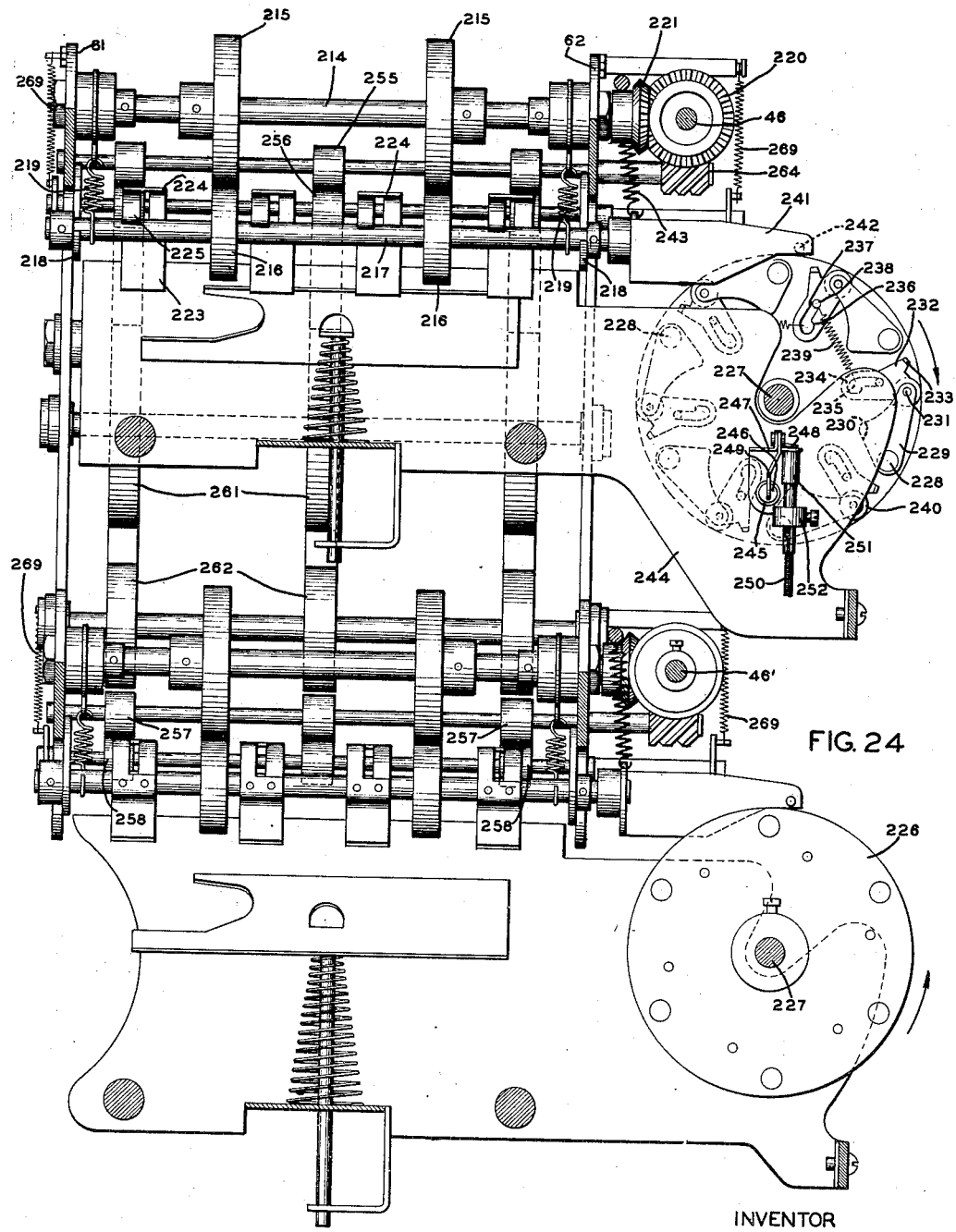
Fig. 24 is a sectional view, taken along the line 24—24 of Fig. 23, showing details of the station or pocket operating mechanism and of the timing discs.

The rollers 28 and 29 (Fig. 1), previously mentioned, convey the punched cards from the analyzing device to the receiving stations, or the card pockets. Means will now be described for receiving the cards from the transmission rollers 28 and 29, and conveying them to the station selected to receive them at the time they were analyzed. The means are preferably similar to those described in Letters Patent No. 1,476,161, issued December 4, 1923, though it is to be understood that any other means known in the art for accomplishing the same purpose may be used if so desired. Referring to Figs. 1, 23 and 24, the receiving stations are divided into two groups, one group including stations or pockets 212 which are adapted to receive the cards to be selected and the other group including stations or pockets 213 which are adapted to receive the cards to be redistributed. The redistributing stations 213 are disposed below the selecting stations 212 (see Fig. 1) and a belt conveyor, which will be described later, is provided for conveying the punched cards that pass the selecting stations 212 to a selected redistributing station 213. As the mechanism associated with each group of receiving stations is identical, a description of that associated with the selecting stations will suffice for both.

Between the side walls 61 and 62 there are mounted a plurality of horizontal shafts 214, there being preferably one of these shafts over each of the open upper ends of the receptacles or receiving stations 212. These shafts are mounted in bearings supported by the side walls 61 and 62 and carry rollers 215 cooperating with lower rollers 216 loosely mounted on shafts 217, which are supported by J-shaped clips 218 each secured to one of the side walls 61 or 62. The upper and lower rollers are retained in positive engagement by means of springs 219, each of which has its ends attached to a bearing of a shaft 214 and to a shaft 217. The contacting surfaces of the upper and lower rollers are disposed in line with the plane of the path of movement along which the cards travel in their progress toward the receiving stations. The shaft 46 (Fig. 36) is provided with a plurality of bevel gears 220, each meshing with a bevel gear 221 mounted on an upper roller shaft 214, whereby the upper rollers 215 are driven to feed cards lengthwise of the series of receiving stations. The shaft 46′, for driving the rollers associated with the redistributing stations 213, is suitably driven, as shown in Fig. 36, from the roller shaft 30 adjacent to the analyzing device.

Each receiving station is provided with means to arrest the travel of a card that is to be deposited at the station. For this purpose a deflector is rigidly connected to each shaft 217. Each deflector is associated with one of the receiving stations 212 and includes four deflector bars 223. Each deflector bar includes a part 224, normally lying in line with the path of card movement, which cooperates with similar parts on the three associated deflector bars to cover and close the entrance to the associated card station, as shown in Fig. 1, whereby a card not to be deposited at any particular station is prevented from entering the station. Each deflector bar also includes a guide member 225, which cooperates with similar members on the other three deflector bars associated with a receiving station to arrest the motion of the card and direct it into this station whenever the four deflector bars are moved upward by shaft 217.

The means for thus operating the deflectors comprises a plurality of timing discs 226, similar to those disclosed in the above mentioned patent. These discs determine the time at which the deflectors are to be raised so that the deflector at any station is operated at precisely the right moment to admit the card to be deposited at that station. They are mounted on timing shafts 227, provided with bearings supported by the side walls 62. The timing shafts 227 are driven by the main drive shaft 38 through a suitable gear train, as is shown in Fig. 36. There is one of these timing discs for each receptacle or receiving station as appears from Fig. 36. Disposed around each disc, and spaced at equal distances, are a plurality of tripping supports or pivots 228, on which are pivotally mounted settable tripping means in the form of cams 229, each of which is provided at its inner edge with a cam surface or projection 230. At the free end of each settable cam is secured a pivot pin 231, on which is pivotally mounted a detent 232, provided with an outwardly pointing releasing finger 233 and a detent 234. The detent 234 is provided with a slot 235 having an active detent shoulder 236, and an inactive detent shoulder 237, either one of which is adapted to rest against a detent pin 238 mounted upon the disc 226 and located in this slot. The shoulder 237 is held pressed against the detent pin 238 by means of a tension spring 239 connected to the detent 234 and to any suitable fixed point on the disc 226. Upon each pin 231 there is also carried a roller 240, adapted, when the active shoulder 236 engages the detent pin, to engage an operating arm 241 fixed upon the shaft 217, whereby the said shaft is operated to raise the deflector thereon and deflect a card into a receiving station. After the operating arm 241 has been operated, the releasing finger 233 engages the releasing pin 242 carried upon the outer end of the operating arm, whereby the active shoulder 236 is forced away from the detent pin 238 and the spring 239 causes the tripping cam and detent to move inward until the pin 238 is engaged by the inactive shoulder 237. The operation of arm 241, shaft 217 and of the card deflectors fixed on said shaft is accomplished against the tension of a spring 243 (see Fig. 36), which has one of its ends connected to the right-hand end of arm 241 and its other end attached to a suitably provided rod.

Fixed to the bracket plates 244, which form the front and rear compartments of the stations 212 and adjacent to each timing disc, is a plunger cylinder 245 (see also Fig. 36) in which is arranged a spring retractable plunger 246. Upon the lateral extension 247, supported by the bracket 244, is pivotally mounted a bell crank 248 having one arm 249 engaging the plunger 246 and another arm adapted to be engaged by the end of the Bowden w're 250, which is enclosed at the end adjacent this bell crank by a flexible casing 251 supported by means of a clamp 252 attached to the bracket plate 244. The other end of this Bowden wire is adjacent an upper pocket operating slide, as 82 (Fig. 2) in one of the sections. Similarly, other Bowden wires each have one end adjacent a similar bell crank associated with a t'ming disc controlling one of the redistributing stations 213, and another end associated with a lower pocket operating slide, as 83, in one of the sections.

The machine is designed to feed cards from the analyzing device to the most remote card pocket 213 in exactly six machine cycles, or what is the same thing, while the timing shafts 227 are making one revolution. It is to be noted that in Fig. 1 a space equivalent to that occupied by several card pockets is traversed by the cards before the first selecting pocket 212 is reached, while a greater space is traversed in passing from the last selecting pocket 212 to the first redistributing pocket 213. As the card must be fed from the analyzing device to the last redistributing pocket 203 in six cycles of the machine, the gears 220 and 221 are selected of the proper ratio to feed the cards through that distance at the desired rate of speed.

In view of the fact that the receiving stations 212 are placed at progressively greater distances from the analyz'ng device, a greater length of time is required for a card to reach the stations more remote from this device than to reach the stations nearer to it. Accordingly, a card to be deposited in a remote station may reach that station after a later sensed card reaches a nearer station at which it is to be deposited. It is evident from this that the sorting of the cards would be delayed if the cards were deposited in the order in which they are sensed. To avoid this delay, the deflector shaft 217, at a station where a card is to be deposited, is operated at the instant the card reaches the station, and accordingly the cards are deposited at their respective stations in the order in which they reach those stations. The deflector shafts at the various stations are operated at the instant the cards reach the stations by so placing the plungers 246 in relation to their deflector operating arms 241 that a tripping cam comes into operative relation with a plunger at a time a card is in analyzing position. The plunger actuated tripping cam is then allowed the same time to pass from the plunger to the deflector operating arm as the analyzed card requires to travel from the analyzing device to the card pocket or station associated with the deflector operating arm. To compensate for the increasing distances traversed by the cards in passing from the analyzing device to more remote stations, the plungers 246 associated with stations nearer to the analyzing device are positioned nearer to the corresponding deflector operating arms 241 than the plungers associated w'th stations more remote from this dev'ce, as may be seen in Fig. 36.

The positions of the plungers are determined in the following manner. A single card is placed in the machine and the machine is operated by hand until the card reaches the deflector at a particular station. The timing disc associated with the station is then fixed to the proper timing shaft 227 with one of the rollers 240 positioned to operate the arm 241. The machine is thereupon turned backward by hand until the card reaches the analyzing device and the sensing pins are in depressed pos'tion. At this time, the detent 232, previously in operative position with respect to the arm 241, is in the position in which it must be operated if it is to rock the arm 241 at the instant the card that actuated the plunger arr'ves at the corresponding station. Accordingly, the plunger 246 is positioned to operate the detent 232 when it is in this position. In a similar manner, the plungers associated with the other timing discs are positioned with respect to the arms 241.

When a card, being analyzed, is between the plates 19 and 20, pins 48 penetrate perforations in the card and depress plungers 66; whereupon the section releasing cams 163 cause the minor pins, except those disabled, to sense the depressed plungers. The pocket operating slides, as 82, in a section hav'ng a stored selecting pattern corresponding to the pattern on the card being sensed, are then moved to the left a sufficient distance to actuate a Bowden wire, as 250. The actuation of this wire rocks the bell crank 248, which projects the plunger 246 into position to be engaged by the tripping cam 229, and holds the plunger in this posit'on until the tripping cam is positively actuated. The means for insuring this positive actuation of the plunger 246 form no part of the present invention, and for an understanding of these means reference is made to the above mentioned patent.

The conveyor belt mechanism prev'ously mentioned (see Figs. 1, 23 and 36) is housed between extensions to the side walls 61 and 62 which are held in substantially parallel relation by the tie rods 253, and are supported by standards 254 suitably secured thereto and to the lower portion of the side walls. Mounted on shafts, provided with bearings supported in these extens'ons, are rollers 255–262, inclusive. The rollers 255 and 256 are positively driven from the shaft 46 through a helical gear 263 mounted on the shaft and a helical gear 264 mounted on the shaft carrying the roller 255. The rollers 257 and 258 are also positively driven from the shaft 46' in a similar manner. The lower roller of each pair is biased toward the upper roller by means of a tension spring 269. The rollers 255 and 256 are in the path of travel of the punched cards, as they are advanced by the rollers 215 and 216, while the rollers 257 and 258 advance the cards into the path of the rollers associated with the redistributing stations 213. Belts 270 and 271 are so disposed on the rollers 255–262, inclusive, that the cards received from rollers 215 and 216 are received between the belts and conveyed to the rollers associated with the lower group of redistributing stations.

Minor pin restoring mechanism

Means are provided for releasing the operated minor pins preparatory to the setting of new patterns in the various sections. Referring to Figs. 25 and 26, the frame 279, slidably secured to a side plate of the casing carries a plurality of minor pin restoring bars 272. These bars are each common to a row of minor pins and have a plurality of fingers 273, there being one finger for each minor pin. The bars are so disposed beneath the pins that, when the frame 279 is raised, the fingers 273 move the minor pins, that have been set or lowered, to their normal or raised position. The frame is adapted to be raised by a cam 274 mounted on the main cam shaft 124. A lever arm 275, provided with a follower 276 cooperating with the cam, engages at its free end a roller 277 secured to the frame by means of a spindle. A rise 278 on the cam 274 reciprocates the lever arm 275 once during each revolution of the cam, raising the frame and restoring the previously set minor pins to their normal or raised position.

Means are also provided for reengaging the released triggers, as 98 and 106, with their associated catches, as 100 and 107. The selecting members, as 96, are supported on rods 74 secured to the trigger restoring bars 75. These bars are slidably supported on a side plate of the casing by stud screws which extend through slots in the bars. Links 280 connect these bars to cranks 281, which are pivotally secured to the side plate of the casing. A link 282 is eccentrically connected to the crank 281 and slidably connected to a lever arm 283, which is provided with a follower 284 cooperating with a rise 285 on the cam 133. When the follower 284 engages the rise 285 once during each revolution of the cam, the bars 75 are forced outwardly, thereby relatching any of the triggers, as 98, that have been released. When this occurs the selecting members, as 96, in all of the sections are again conditioned to be selectively released under control of the pocket selecting bars, as 137 and 137'.

Means, such as those disclosed in the above mentioned patent, may be provided for automatically stopping the machine in the event that no card is fed to the plates 19 and 20. These means are not disclosed in this application.

Operation of the machine

Figure 16:
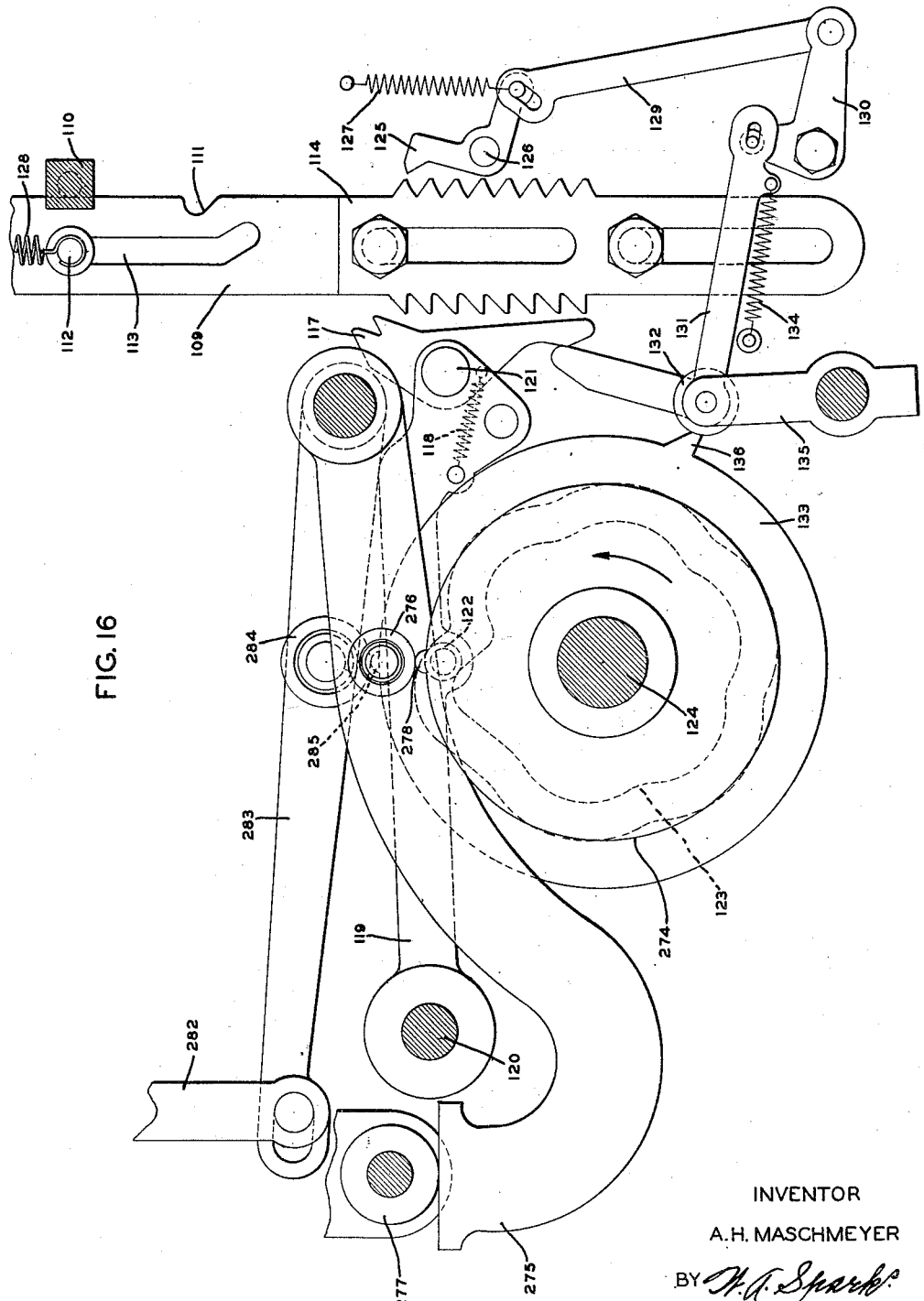
Fig. 16 is a sectional view similar to that of Fig. 14, showing the section releasing bar in its non-operative and released position.

The operation of the machine will now be described. A stack of cards comprising a number of punched cards to be sorted, and a number of master cards, five or less, are placed in the magazine 3, with the master cards above the cards to be sorted. The electric motor M is then started and plunger 199 is pulled out, thus connecting the main cam shaft 124 to the main drive shaft 38. Referring to Fig. 37, which shows the chart of the time relations between various operations, the left-hand vertical column of numerals indicates in degrees the position of the main cam shaft 124, while the right-hand column indicates in degrees the position of the main drive shaft 38. Upon the starting of the machine, all previously operated parts are restored to normal position. The main drive shaft begins to rotate, thus permitting the rotation of the main cam shaft. When the latter shaft begins to rotate, the roller 207 on the spring tensioned plunger 206 is moved out of the recess 211. The cam 274 then raises the frame 279, whereupon the fingers 273 in the restoring bars 272 move the operated or set minor pins to their raised or inoperative position. The cam 133 causes the bars 75 to be forced outwardly, thereby relatching all previously unlatched triggers 98 and conditioning the pocket operating slides, as 82 and 83, for selection. The section releasing bars 109, which were in raised position, as shown in Fig. 17, are restored to their lowered position, as shown in Fig. 16, when cam 133 trips the stepping pawl 117 and the stop pawl 125. This restores the pocket operating slides, as 82 and 83, in all the sections to the control of the section releasing bars. Shortly after this last operation occurs, the cam 186 removes the pocket operating slides from the control of the section releasing cams 163. Likewise, when the machine is started, the picker bar 9 feeds the cards one at a time from the bottom of the stack, after which they are fed into the space between the plates 19 and 20. The sensing head 47, which was lowered during the restoring operation, is now raised and the section releasing bars 109 permit the retraction of the pocket operating slides, as 82 and 83, in the first or uppermost section by springs, as 88 and 90, whereupon the lugs 80 on the minor pins 69 in this section enter notches 81 in the plungers 66. As the minor pins 69 in the first storage section are now associated with the upper pocket operating slide 86 by the latches 94, the entrance of the lugs 80 on these pins into the notches 81 causes the upper pocket operating slide, through a Bowden wire 250, to condition the selecting station 212 associated with the first section to receive the first master card after it has been analyzed. The first master card has by this time been carried between the plates 19 and 20 and it is now momentarily arrested by means, well known in the art but not shown here, to permit the card to be sensed by the pins 48. While the card is thus stationary, the sensing head 47 is lowered and the lever arms 141 are depressed in accordance with the pattern perforations punched in the upper and lower and marginal areas of the card, while the plungers 66 are depressed in accordance with the pattern or perforation punched in the remaining perforate area of the card. The depression of the lever arms 141 either latches the pin carrier plates, as 70 or 71, to the associated lower pocket operating slide 83, or unlatches the pin carrier plates from the associated upper pocket operating slide 82. Latching of a pin carrier plate with the lower pocket operating slide conditions a half column of minor pins, when the card is a 90 column card, or a column of minor pins when the card is a 45 column card, to control the selection of a station 213 in the redistributing group. The unlatching of a pin carrier plate from the upper pocket operating slide disables a half column of minor pins, when the master card is a 90 column card, or a column of pins, when the master card is a 45 column card; that is, it prevents the disabled minor pins from controlling the selection of either a station 212 in the selecting group or a station 213 in the redistributing group.

The depression of the plungers 66 moves corresponding minor pins 69 to their lowered or set position. Following this, the section releasing bars 109 move the minor pins of the first section out of engagement with the plungers 66 and then the sensing head is raised permitting the plungers 66 to be restored to their raised position by the springs 68. The first section of minor pins is thus conditioned to select a receiving station 212 in the selecting group whenever a card having a selecting pattern is sensed by the pins 48, and is conditioned to select a receiving station 213 in the redistributing group, whenever a card having a redistributing pattern is sensed by the pins 48. The perforated area of the punched cards in which a selecting pattern appears may be any predetermined area, as may likewise be the area in which the redistributing pattern of a card appears. This is made possible by the fact that any area element, that is, any half column or any column of minor pins, may be selectively conditioned to control either a selecting or a redistributing station, as explained in detail above. After the analyzing operation performed on the first master card, this card is fed out of the card chamber and is deposited in the selecting station 212 associated with the first storage section, which, as previously described, was conditioned to receive it when the lugs 80 on the minor pins 69 entered the notches 81 in the plungers 66. The section selecting bars next permit the retraction of the pocket operating slides, as 82 and 83, in the second section by springs, as 88 and 90, whereupon the minor pins of the second section are conditioned to be set by the plungers 66 and the selecting station 212 associated with the second storage section is conditioned to receive the second master card. By this time the second master card is arrested between the plates 19 and 20 and the sensing head is again lowered, setting the minor pins of the second section to select receiving stations 212 or 213, depending upon whether a selecting or a redistributing pattern is sensed on the master card by the pins 48. After the second master card is analyzed, it is deposited in the selecting station 212 associated with the second storage section.

In this manner, minor pins in the remaining sections, or the minor pins in as many sections as there are remaining master cards, are set to select stations 212 and 213, whenever cards having predetermined selecting and redistributing patterns are sensed by the pins 48 and the master cards are deposited in the proper selecting stations 212.

When the sensing head has passed through six reciprocating cycles, the main cam shaft, as will appear upon reference to Fig. 37, has made one revolution. At this time, the cam 186 causes all the pocket operating slides, as 82 and 83, to be placed under control of the section releasing cams 163, and, following this, the cam 133 causes the pocket operating slides to be removed from control of the section releasing bars 109. The cam 186 then releases the clutch 191, disconnecting the main cam shaft 124 from the main drive shaft 38, and the clutch is retained in released position by the spring-pressed plunger 199. When power is disconnected from the main cam shaft 124, the plunger 206 locks this shaft.

The machine is now ready to sort the remaining punched cards which begin to arrive between the plates 19 and 20. The sensing head, which is now in its raised position, is next lowered and the plungers 66 are depressed in accordance with the pattern or perforations punched in the card.

It is to be noted that the pocket selecting bars 137 are never depressed during a sorting operation, but only during the setting or storing operation previously described, since the master cards alone, and not the cards to be sorted, contain perforations in the lower and the upper marginal areas.

When the plungers 66 are depressed by the lowering of the sensing head, the section releasing cams 163, which have the same speed as the main drive shaft 38, place the pocket operating slides under control of springs, as 88 and 90, whereupon the minor pins, except those half or full columns which have been disabled, sense the plungers 66. In this way the selecting and redistributing patterns stored in the minor pins of each section are simultaneously compared with the patterns of the card sensed by the pins 48. If the pattern on the punched card corresponds to the selecting pattern stored in the minor pins of a section, the lugs 80 on the minor pins of this section previously associated with an upper pocket operating slide, as 82, enter the notches 81 of the corresponding plunger 66, thus permitting the upper pocket operating slide to be retracted by its springs. The retraction of this slide actuates a Bowden wire 250, which projects the plunger 246 at the station where the analyzed card is to be received. The projected plunger sets the tripping cam 229, which is at this time coming into operative relation with the plunger. When this takes place, the tripping cam 229 and the card which has caused this setting, respectively travel towards the operating arm 241 and the deflector 223 associated with that station, and because of the relation between the location of the plunger 246, the distance of the receiving station from the analyzing device and the traveling speds of the tripping cam on the card, the roller 228, associated with the tripping cam, comes into operative relation with the operating lever 241, just before the card reaches the deflector 223. When this occurs, roller 228 operates the arm 241, and consequently the associated deflector, which deflects the card into the designated receiving station. The roller 228 passes on, permitting the deflector to fall so that a card, immediately following the card thus deflected, would pass over the deflector on its way to a more remote station. If such a card was designed to be received at the same station, the deflector is immediately operated again in the manner just described. After the operating arm has been lowered, the tripping finger 233 engages the pin 242, thus releasing the shoulder 236 from the detent pin 238, upon which the tripping cam resumes its normal or retracted position.

If the pattern in the punched card being analyzed corresponds to a redistributing pattern stored in the minor pins of a section, the deflector at the proper redistributing station 213 is similarly raised and the card deflected into that station. In this case, the card is conveyed from the group of selecting stations to the group of redistributing stations by the conveyor belts 270 and 271.

The operations described above are repeated until all the cards are analyzed and deposited either in the selecting stations, as 212, or in the redistributing stations as 213. It is evident that when one card contains patterns corresponding to both the selecting and redistributing patterns stored in the same section of the machine, the card will be deposited at a predetermined selecting station 212 rather than at a redistributing station 213, thus giving a pattern of one class priority over the pattern of another in determining the disposition to be made of the cards.

A modification of the present invention is shown in Figs. 38 and 40. This alternative may be employed to sort finger print punched cards classified according to the well known Henry system of finger print classification. A punched card of this type, adapted to be analyzed and sorted by this modification, is shown in Fig. 39. For an understanding of the Henry system of finger print classification reference is made to "The Finger Print Instructor" by Frederick Kuhne, published in 1916 by Munn & Co., Inc., of New York city. The Henry system is based upon a classification determined by the ridge patterns of all ten fingers. In this system the finger print impressions are imprinted on suitable cards and these cards are then filed in accordance with a classification consisting of a primary classification and a number of subordinate classifications. The number of subordinate classes used is dependent upon the number of finger prints on file; being greater in a file containing a large number of finger prints than in one containing a small number, in order to keep the number of cards filed together in a single sub-class below the amount which makes search of the cards inconvenient. As shown on the card of Fig. 39, under the caption "Classification", the primary numerical classification is stated in the form of a fraction as $5/17$, and the subordinate cassifications are also stated in the form of a fraction, as $$\frac{T}{U}$$

These letters represent pattern types, "T" standing for tented arch, and "U" for ulnar loop patterns. As the method of arriving at this classification of finger prints is unnecessary to an understanding of the alternative embodiment of the invention, no attempt will be made to explain it here, but reference is made to the above mentioned publication.

In a finger print file containing a moderately large number of finger print cards, filed according to the classification outlined above, a large number of finger print cards are included in the same class, and are, therefore, filed together. When the finger prints of a person to be identified are taken, they are classified according to the system outlined above, and then a search is made through the filed finger print cards having the same classification until a corresponding card is found. As there may be anywhere from ten to fifty cards in the class searched, the search may require some time and, furthermore, must be made by a finger print expert. Another difficulty attending the manual search for finger prints filed according to this system may be pointed out. In arriving at the classification of some finger prints, the sub-class entering into the classification may be dependent upon ridge counting and ridge tracing and because of individual erors in such counting or tracing errors are frequently made in classifying the finger prints. Accordingly, when a search is being made for a finger print card, and the card is not found filed in the proper class, the possibility that an error was made in originally classifying the card makes it necessary to extend the search to adjacent classes.

By the use of the present invention, finger print cards may be filed in classes identified by a primary numerical classification and one subordinate classification obtained according to the Henry system. The cards in each class may be numbered consecutively and then filed in classes identified by the three characteristics of primary class, subordinate class and number. Thus, where the classification, including the primary classification and one subordinate classification is $$\frac{5T}{17U}$$

the cards in this subclass are filed in numerical order, as from 1–50. For each finger print card, a card such as that shown in Fig. 39 is punched. This card is divided into thirteen fields; fields I–V representing the fingers of the right hand, which are each divided into five columns; fields VI–X, representing the fingers of the left hand, likewise divided into five columns each. Field XI in which the Henry system classification numerator may be punched is divided into eight columns and field XII in which the denominator of this classification may be punched is also divided into eight columns. In field XIII, which is an imperforate area of the card, any desired notations relating to the set of finger prints may be made. For example, there may be entered here the classification according to the primary and one subordinate classification of the Henry system, the serial number under which the corresponding finger print card is filed, and any peculiarities useful in identifying the set of finger prints.

The object in providing a punched card for each finger print card is to eliminate the disadvantages of manual finger print searching whenever a person is to be identified by substituting for it a mechanical searching of a punched card file.

On each of the punched cards, ten finger print patterns are so thoroughly characterized by means of perforations punched in the card that it is highly improbable that any two persons will have finger print patterns represented by two identical punched cards. To characterize the print of each finger with the necessary degree of thoroughness, any one of a number of general patterns appearing on any finger may be represented in the first column or in the first two columns of the field assigned to that finger and then distinguishing features or characteristics of the general pattern may be represented in the remaining three or four columns, as the case may be. It may be observed that the general patterns thus used exclude those obtained by ridge counting and ridge tracing, which introduce the uncertainties mentioned above when manually searching for cards filed under the ordinary Henry system of finger print classification. The characteristics of each finger on the punched cards is then definite and highly individualized, and the observational variation introduced by the personal equation, where ridge counting and ridge tracing are relied upon, is eliminated. After the impressions of all ten fingers have been analyzed, the complete set of ten finger prints is classified as a unit according to the primary classification and one subordinate classification of the Henry system. It is to be understood, however, that in cases where a finger print file contains a large number of finger print cards, the finger prints may, if necessary, be classified according to any number of sub-classifications desired. An analysis of each of the ten fingers is then punched in fields I to X of the cards; the classification numerator is punched in field XI and the classification denominator is punched in field XII.

It is to be observed that the fields I to X are always used for the finger print patterns and the fields XI and XII are always used for the numerator and denominator, respectively, of the Henry system classification. As a definite area of the punched cards is used for finger print patterns and another definite area is used for the finger print classification, it is unnecessary, as will appear later, to punch perforations in the upper and lower marginal areas of the master cards for the purpose of selecting a group of stations in which the cards are to be deposited. It is merely necessary to punch disabling perforations in these areas of the master cards.

Referring to Fig. 40, the alternative embodiment is shown in sufficient detail to afford a clear understanding of the invention. Only the parts of this drawing which differ from the embodiment first described will be specifically mentioned.

Referring to Fig. 38, bars 286 and 287 are shown connecting one group of pocket operating slides, as 288, which may control the selection of a predetermined station in a redistributing group as 213, and bars 286' and 287' are shown connecting the remaining pocket operating slides, as 288', in the same section, which may control the selection of a predetermined station, as 212, in the selecting group. Each section is thus divided into sub-sections, as A and B (Fig. 38) and the pocket operating slides in each sub-section control the actuation of a receiving station in a particular group. The upper bars, as 286 and 286', in each sub-section are normally engaged by latches, as 289 and 289'. Each half column of minor pins in each sub-section is thus conditioned to control the selection of a predetermined station in a particular group. Each half column of minor pins in sub-section A is normally conditioned to control the selection of a predetermined station, as 212, in the selecting group, and each half column of minor pins in sub-section B is normally conditioned to control the selection of a predetermined station, as 213, in the redistributing group. Any half column of minor pins in a section may be disabled, if desired. This is effected by means of a disabling bar 290 which is adapted when depressed to release a trigger control selecting mechanism individual to each latch, as 289 and 289'. The operation of the trigger controlled disabling mechanism disconnects a latch, as 289, from an upper bar, as 286, thereby disabling the corresponding half column of minor pins. The disabling bars, as 290, are adapted to be depressed when a pin, as 291, mounted in the sensing head, enters a large perforation 140' in either the upper or lower marginal areas of a card. It will be noted that the pin 291, unlike the pin 138—138' (Fig. 5) is not a double pin, since the disabling bars need not be selectively depressed.

Referring now to Fig. 38, the minor pins in sub-section A in the sections may be set by master cards to select punched cards corresponding to the finger prints of any one of five different persons. When the punched cards are run through the machine, the machine selects cards having patterns in fields I to X, inclusive corresponding to the patterns stored in the minor pins of any sub-section A, and deposits these cards in the proper receiving station, as 212, in the selecting station group. The machine likewise selects the remaining cards having patterns in fields XI and XII, corresponding to the patterns stored in the minor pins of any sub-section B, and deposits each of these cards in the proper receiving station, as 213, in the redistributing group.

When any punched card has been deposited at a receiving station, as 212, the serial number appearing in field XIII of the card will enable the corresponding finger print card to be selected from the finger print file. If it should happen that more than one person has finger print patterns represented by identical cards, these cards will be deposited in the same station, as 212, and a comparison of the finger print cards corresponding to them will have to be made with the finger print card of the person to be identified in order to determine the identity of this person. In some cases, however, the notations in field XIII mention peculiarities in the finger prints which may serve to identify the finger print card of the person to be identified without resorting to the above comparison.

It is to be understood that the punched cards may be divided into as many areas as may be desired, and each area arranged to control the selection of receiving stations in a particular group.

Thus, instead of two groups, as shown in Figs. 38 and 39, each card might be divided into three different and definite areas, in which case the bars, as 286, 287, 286' and 287', would connect two-thirds of the pocket operating slides in each section and other bars would connect the remaining third of the pocket operating slides in each section. The pocket operating slides and minor pins in the remaining third of each section would then control a predetermined receiving station in a third group of such stations.

Modifications of the machine necessary to enable it to sort cards into a larger number of groups will be evident from the above description and it is believed unnecessary to describe them herein.

The present machine is designed to sort both the cards to be selected and the cards to be redistributed or refiled during a single run of the cards through the machine. The presence in a detail card of a pattern corresponding to a stored redistributing pattern causes a redistributing pocket to be conditioned to receive a card. The presence in a detail card of both a pattern corresponding to a stored selecting pattern and a pattern corresponding to a stored redistributing pattern causes both a selecting pocket and a redistributing pocket to be conditioned to receive the card, but the selecting pocket is given precedence over the redistributing pocket. The desired detail cards are thus deposited in the proper selecting pockets and the remaining cards are deposited in redistributing pockets in accordance with their filing number or classification. The sorting of the cards to be redistributed or refiled eliminates the necessity of manually separating the different groups of unselected cards or of running them through the machine again before returning them to file. Either one of these operations must be resorted to when the ordinary sorter is employed, for then the several groups of unselected cards are not sorted into groups but are deposited in a single reject pocket. But with the present machine, the unselected cards may be taken from the redistributing pocket in which they have been deposited and returned to file.

In some types of filing systems, the classification number may be punched in one field of a card at one time and in a different field at another time. Accordingly, the machine first described is provided with means for redistributing cards having a classification number punched in any area.

In other types of filing systems, however, the classification number may be invariably punched in the same field of the cards, while the data may be invariably punched in another area of the cards. This condition exists in a finger print card file of the type described above, the information concerning the finger prints of an individual being punched in fields I to X, inclusive, and the classification in fields XI and XII. In dealing with cards of this type, the modified form of the machine may be used. In this form of the machine, the cards having certain data in the selecting fields, as fields I to X, in Fig. 39, are selected and the remaining cards are redistributed in accordance with the classification number in the redistributing field, as fields XI and XII of Fig. 39.

The machine is provided with disabling means whereby the data in any unit of area in the detail cards may be disregarded during the comparison operation. The ability to disregard the data in any desired area of the detail card is of considerable importance. In insurance work, for example, it may be desired at one time to select all cards paying a certain premium, at another, to select all cards representing a particular type of policy. In the first instance, all of the columns in a storage section are disabled except the columns corresponding to the premium field and to the classification number field in the detail cards, and in the second instance, all of the columns in a storage section are disabled except the columns corresponding to the type of policy field and to the classification number field in the detailed cards. In finger-print identification work, a finger of a person to be identified may be missing. In this case, the columns in a storage section, corresponding to the field in the detail cards, ordinarily containing information about the print of this finger, are disabled. Thus, if the right thumb is missing, the columns in field I of Fig. 39 are disabled, and columns 1-5 of the detail cards are disregarded in searching for the card having a finger-print pattern identical with that set up in the machine by the master card.

In cases where one or more of the storage sections are not utilized, as where cards having a single selecting pattern are to be selected from a single file classification, a blank card for each of the storage sections not utilized is inserted between the master card or cards. Thus, if a selecting and a redistributing pattern are stored in the first storage section only, then four blank cards are inserted between the master card adapted to effect storage of these patterns in the first storage section and the detail cards. These blank cards prevent setting of the minor pins in the four storage sections not utilized, and in effect condition each of these sections to select blank cards. As there are no blank cards among the detail cards, it will be evident that no cards will be deposited in the card pockets or stations 212 and 213 associated with those four sections, but that all of the detail cards will be deposited in either the selecting pocket 212 or the redistributing pocket 213 associated with the first storage section.

The machine is designed automatically to store patterns from each of a number of master cards and then, after shifting automatically from the pattern storing operation to a pattern comparing operation, simultaneously to compare the patterns on each detail card with each of the stored patterns. The automatic storing of the patterns sensed from the master cards and the automatic changeover from storing to comparing, eliminates the necessity of any action by the operator beyond placing the master and detail cards in the machine and initiating the pattern sorting operation.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. In a classifying machine, a device for analyzing master and data cards to determine the patterns carried by said cards, a plurality of stations, means controlled by said device for storing the patterns of the master cards presented to said device and for rendering said stations individual to the stored patterns, means for comparing the stored patterns with the patterns of data cards presented to said device, and means for preparing a station to receive a data card whenever a pattern on said cards corresponds to the stored pattern individual to said station.

2. In a classifying machine, a device for analyzing master and data cards to determine the patterns carried by said cards, a plurality of stations, means controlled by said devices for storing the patterns of the master cards presented to said device and for rendering said stations individual to the stored patterns, means for comparing the stored patterns with the patterns of data cards presented to said device, and means responsive to said comparison means for preparing a station to receive a data card whenever a pattern on said card corresponds to the stored pattern individual to said station.

3. In a classifying machine, a device for analyzing master and data cards to determine the patterns carried by said cards, groups of stations, means controlled by said devices for storing the patterns of the master cards presented to said device and for rendering the stations in said groups individual to the stored patterns of the master cards, means for comparing the stored patterns with the patterns of data cards presented to said device, and means for preparing a station in one of said groups to receive a data card whenever a pattern on said card corresponds to the stored pattern individual to said station.

4. In a classifying machine, an analyzing device, storage means including a plurality of sections each provided with means settable under control of a master card for storing the pattern elements of one of a plurality of said master cards presented to said device, means for comparing the pattern elements in each data card presented to said device with corresponding elements in each section, groups of stations, and means for preparing a station in each group to receive a card whenever the patterns in said card correspond to the stored patterns in one of said sections.

5. In a classifying machine, an analyzing device, storage means including a plurality of sections each provided with means for storing the pattern elements of one of a plurality of master cards presented to said device, means for comparing the pattern elements in each data card presented to said device with corresponding elements in each section, groups of stations, means for preparing a station in each group to receive a card whenever the patterns on said card correspond to the stored patterns in one of said sections, and means for giving the prepared station in one of said groups precedence in receiving said card.

6. In a classifying machine, an analyzing device, storage means including a plurality of sections each provided with means for storing the pattern elements of one of a plurality of master cards presented to said device, means for successively associating said sections with said device as said master cards are presented thereto, means for comparing the pattern elements in each data card presented to said device with corresponding elements in each section, and means for preparing one of said stations to receive a data card whenever a pattern on said card corresponds to a stored pattern in one of said sections.

7. In a classifying machine, a device for analyzing master and data cards to determine the patterns carried by said cards, means adapted to be conditioned by the master cards presented to said device to detect any one of a plurality of sets of patterns in data cards presented to said device, groups of stations for receiving said data cards, other means adapted to be conditioned by the master cards presented to said device to select a station in each group whenever a set of patterns is detected in a data card, and means for giving the selected station in one group precedence over the remainder of the selected stations in receiving said data card.

8. In a classifying machine, a device for analyzing master and data cards to determine the patterns carried by said cards, means adapted to be conditioned by the master cards presented to said device to detect any one of a plurality of sets of patterns in data cards presented to said device, groups of stations sequentially arranged for receiving said data cards, other means adapted to be conditioned by the master cards presented to said device to select a station in each group whenever a set of patterns is detected in a data card, and means for giving the selected station in the first group precedence over the remainder of the selected stations in said groups in receiving said data card.

9. In a classifying machine, a device for analyzing master and data cards to determine the patterns carried by said cards, means adapted to be conditioned by the master cards presented to said device to detect patterns appearing in selectable areas of data cards presented to said device, a plurality of stations, means adapted to be conditioned by the master cards presented to said device to precondition each station to receive data cards having an individual pattern appearing in a particular area of said cards, and means for preparing a station to receive a data card whenever the pattern individual to the station is detected in the card.

10. In a classifying machine, a device for analyzing master and data cards to determine the patterns carried by said cards, means adapted to be conditioned by the master cards presented to said device to detect a plurality of patterns appearing in invariable areas of data cards presented to said device, a plurality of stations, each adapted to receive data cards having one of said patterns, and means for preparing a station to receive a data card whenever the pattern individual to said station is detected in the data card.

11. In a classifying machine, a device for analyzing master and data cards to determine the patterns carried by said cards, means controlled by master cards presented to said device for storing a plurality of patterns, a plurality of stations, means also controlled by master cards presented to said device for selecting stations individual to said patterns, means for comparing the stored patterns with the patterns of data cards presented to said device to determine the stations adapted to receive said data cards, means for shifting from the comparing operation to the storing and selecting operations, and means for wiping out the stored patterns and for releasing the selected stations before starting the storing and selecting operations.

12. In a classifying machine, a device for analyzing master and data cards to determine the patterns carried by said cards, means controlled by said device for storing the patterns of master cards presented to said device, means for comparing the stored patterns with the patterns of data cards presented to said device, means for holding the comparing means inoperative during the storing operation, and other means for preventing patterns from being stored in the storing means during the comparing operation.

13. In a classifying machine, a device for analyzing master and data cards to determine the patterns carried by said cards, means controlled by said device for storing the patterns of master cards presented to said device, means for comparing the stored patterns with the patterns of data cards presented to said device, means for changing over from the comparing to the storing operation before the starting of the storing operation, and other means for automatically changing over from the storing to the comparing operation at the termination of the storing operation.

14. In a classifying machine, the combination of means for sensing master and data cards in succession, groups of stations for receiving said cards, a plurality of pattern storage sections divided into sub-sections, means for storing patterns from successive master cards in consecutive sections, each pattern being stored in a separate sub-section, means for comparing the pattern stored in each sub-section with a pattern sensed from a data card, and means effective when a pattern on the card is identical with the pattern stored in any sub-section for depositing the card in a station having a location determined jointly by the sub-section and the section containing said sub-section.

15. In a classifying machine, the combination of means for sensing master and data cards in succession, groups of stations for receiving said cards, a plurality of pattern storage sections divided into sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a plurality of stations to receive the card, and means for giving one of said stations precedence in receiving said card.

16. In a classifying machine, the combination of means for sensing master and data cards in succession, groups of stations for receiving said cards, a plurality of pattern storage sections divided into sub-sections, means for storing patterns from successive master cards in consecutive sections, each pattern being stored in a separate sub-section, means for comparing the pattern stored in each sub-section with a pattern sensed from a data card, and means effective when a pattern on the card is identical with the pattern stored in any sub-section for depositing the card in a station which is in a group determined by the sub-section and occupies a position in the group determined by the section containing said sub-section.

17. In a classifying machine, the combination of means for sensing master and data cards in succession, sequentially arranged groups of stations for receiving said cards, a plurality of pattern storage sections divided into sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a station in each of a purality of groups to receive the card, and means for depositing the card at the conditioned station in the group first reached by the card.

18. In a classifying machine, the combination of means for sensing master and data cards in succession, groups of stations for receiving said cards, said groups being disposed at successively greater distances from said sensing means, a plurality of pattern storage sections divided into sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a station in each of a plurality of groups to receive the card, the conditioned station least remote from the card sensing means being given precedence in receiving said card.

19. In a classifying machine, the combination of means for sensing master and data cards in succession, groups of stations for receiving said cards, a plurality of pattern storage sections, means for selectively dividing each section into a plurality of sub-sections, means for storing patterns from successive master cards in consecutive sections, each pattern being stored in a separate sub-section, means for comparing the pattern stored in each sub-section with a pattern sensed from a data card, and means effective when a pattern on the card is identical with the pattern stored in any sub-section for depositing the card in a station having a location determined jointly by the sub-section and the section containing the sub-section.

20. In a classifying machine, the combination of means for sensing master and data cards in succession, groups of stations for receiving said cards, a plurality of pattern storage sections, means for selectively dividing each section into a plurality of sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a plurality of stations to receive the card, and means for giving one of said stations precedence in receiving said card.

21. In a classifying machine, the combination of means for sensing master and data cards in succession, groups of stations for receiving said cards, a plurality of pattern storage sections, means for selectively dividing each section into a plurality of sub-sections, means for storing patterns from successive master cards in consecutive sections, each pattern being stored in a separate sub-section, means for comparing the pattern stored in each sub-section with a pattern sensed from a data card, and means effective when a pattern on the card is identical with the pattern stored in any sub-section for depositing the card in a station which is in a group determined by the sub-section and occupies a position in the group determined by the section containing said sub-section.

22. In a classifying machine, the combination of means for sensing master and data cards in succession, sequentially arranged groups of stations for receiving said cards, a plurality of pattern storage sections, means for selectively dividing each section into a plurality of sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a station in each of a plurality of groups to receive the card; and means for depositing the card at the conditioned station in the group first reached by the card.

23. In a classifying machine, the combination of means for sensing master and data cards in succession, groups of stations for receiving said cards, said groups being disposed at successively greater distances from said sensing means, a plurality of pattern storage sections, means for selectively dividing each section into a plurality of sub-sections, means for storing patterns from successive master cards in consecutive sections, each pattern being stored in a separate sub-section, means for comparing the pattern stored in each sub-section with a pattern sensed from a data card, means effective when a plurality of patterns on the card are identical with patterns stored in a plurality of sub-sections for conditioning a station in each of a plurality of groups to receive the card, the conditioned station least remote from the card sensing means being given precedence in receiving said card.

24. In a machine of the class described, the combination of means for analyzing master cards, a plurality of pattern storage sections, means for successively bringing consecutive sections under control of the analyzing means during successive cycles whereby the patterns from successively analyzed master cards are entered into consecutive sections, and means for automatically terminating the pattern storing operation after a number of machine cycles sufficient to effect the storing of patterns from a different master card in each of said sections.

25. In a machine of the class described, the combination of means for analyzing master and data cards, a plurality of pattern storage sections, means for successively bringing consecutive sections under control of the analyzing means during successive cycles whereby the patterns from successively analyzed master cards are entered into consecutve sections, means for automatically terminating the pattern storing operation after a number of cycles sufficient to permit the storing of the patterns from a different master card in each of said sections, means for comparing the master card patterns stored in the sections with the patterns in successively analyzed cards, and means for automatically initiating said comparing operation during the cycle following the termination of the storing operation whereby the stored master card patterns are compared with the patterns in successively analyzed data cards.

26. In a machine of the class described, the combination of means for analyzing master and data cards, a plurality of pattern storage sections, means for entering the patterns of a predetermined number of successively analyzed master cards into an equal number of consecutive sections, and means for preventing the entry of patterns from successively analyzed data cards into the remaining pattern storage sections.

AUGUST H. MASCHMEYER.